United States Patent
Kondo et al.

(10) Patent No.: US 6,831,992 B2
(45) Date of Patent: Dec. 14, 2004

(54) DATA PROCESSING APPARATUS AND DATA PROCESSING METHOD, DECODING APPARATUS AND METHOD THEREOF, AND RECORDING MEDIUM

(75) Inventors: Tetsujiro Kondo, Tokyo (JP); Naoki Kobayashi, Tokyo (JP)

(73) Assignee: Sony Corporation, Tokyo (JP)

(*) Notice: Subject to any disclaimer, the term of this patent is extended or adjusted under 35 U.S.C. 154(b) by 668 days.

(21) Appl. No.: 09/944,758

(22) Filed: Aug. 31, 2001

(65) Prior Publication Data

US 2002/0064296 A1 May 30, 2002

(30) Foreign Application Priority Data

Sep. 1, 2000 (JP) ........................................ 2000-264922

(51) Int. Cl.⁷ ................................................ G06K 9/00
(52) U.S. Cl. ....................................................... 382/100
(58) Field of Search .......................................... 382/100

(56) References Cited

U.S. PATENT DOCUMENTS 6,128,411 A  * 10/2000 Knox .......................... 382/232

* cited by examiner

Primary Examiner—Leo Boudreau
Assistant Examiner—Chris Lavin
(74) Attorney, Agent, or Firm—Frommer Lawrence & Haug LLP; William S. Frommer

(57) ABSTRACT

A data processing apparatus for embedding second digital data in first digital data comprises: bit-swap means for bit-swapping target data comprising a predetermined number of bits within the first digital data; predicting means for outputting a prediction value which predicts a value corresponding to the target data from marginal data surrounding the target data; sorting means for sorting target data subjected to the bit-swapping according to the prediction margin of error value between a prediction value output by the predicting means and respective values corresponding to target data subjected to the bit-swapping; correction code output means for outputting correction code according to target data subjected to the bit-swapping that has been sorted by the sorting means; and embedded data output means for outputting, as embedded data, one of the target data subjected to the bit-swapping that has been sorted by the sorting means, according to the second digital data.

42 Claims, 29 Drawing Sheets

FIG. 4

| NUMBER OF "0" BITS | NUMBER OF "1" BITS | NUMBER OF PATTERNS (NUMBER OF POSSIBLE COMBINATIONS) | DATA TO BE EMBEDDED (NUMBER OF POSSIBLE COMBINATIONS) | AMOUNT OF INFORMATION (BITS) |
|---|---|---|---|---|
| 0 | 8 | 1 | 0 | 0.0 |
| 1 | 7 | 8 | 8 | 3.0 |
| 2 | 6 | 28 | 28 | 4.8 |
| 3 | 5 | 56 | 56 | 5.8 |
| 4 | 4 | 70 | 70 | 6.1 |
| 5 | 3 | 56 | 56 | 5.8 |
| 6 | 2 | 28 | 28 | 4.8 |
| 7 | 1 | 8 | 8 | 3.0 |
| 8 | 0 | 1 | 0 | 0.0 |

FIG. 14A

| CONVENTIONAL CODE | PIXEL VALUE CORRESPONDING TO CONVENTIONAL CODE |
|---|---|
| 00000001 | 1 |
| 00000010 | 2 |
| 00000100 | 4 |
| 00001000 | 8 |
| 00010000 | 16 (PIXEL OF INTEREST) |
| 00100000 | 32 |
| 01000000 | 64 |
| 10000000 | 128 |

FIG. 14B

| CONVENTIONAL CODE | PIXEL VALUE CORRESPONDING TO CONVENTIONAL CODE | MARGIN OF ERROR (ABSOLUTE VALUE) | CORRECTION CODE |
|---|---|---|---|
| 00010000 | 16 (PIXEL OF INTEREST) | 1 | 0 |
| 00001000 | 8 | 9 | 1 |
| 00000100 | 4 | 13 | 2 |
| 00000010 | 5 | 15 | 3 |
| 00100000 | 32 | 15 | 4 |
| 00000001 | 1 | 16 | 5 |
| 01000000 | 64 | 44 | 6 |
| 10000000 | 128 | 111 | 7 |

FIG. 14C

| CONVENTIONAL CODE | PIXEL VALUE CORRESPONDING TO CONVENTIONAL CODE | MARGIN OF ERROR (ABSOLUTE VALUE) | CORRECTION CODE |
|---|---|---|---|
| 00001000 | 8 | 0 | 0 |
| 00000100 | 4 | 4 | 1 |
| 00000010 | 2 | 6 | 2 |
| 00000001 | 1 | 7 | 3 |
| 00010000 | 16 (PIXEL OF INTEREST) | 8 | 4 |
| 00100000 | 32 | 24 | 5 |
| 01000000 | 64 | 56 | 6 |
| 10000000 | 128 | 120 | 7 |

FIG. 15

| CODE | OLD | NEW | CODE | OLD | NEW | CODE | OLD | NEW | CODE | OLD | NEW |
|---|---|---|---|---|---|---|---|---|---|---|---|
| 00001111 | 15 | 0 | 01110010 | 114 | 116 | 11011000 | 216 | 233 | 01010001 | 81 | 118 |
| 00010111 | 23 | 3 | 01110100 | 116 | 120 | 11100001 | 225 | 236 | 01010010 | 82 | 122 |
| 00011011 | 27 | 7 | 01111000 | 120 | 123 | 11100010 | 226 | 240 | 01010100 | 84 | 128 |
| 00011101 | 29 | 10 | 10000111 | 135 | 127 | 11100100 | 228 | 244 | 01011000 | 88 | 132 |
| 00011110 | 30 | 14 | 10001011 | 139 | 131 | 11101000 | 232 | 247 | 01100001 | 97 | 136 |
| 00100111 | 39 | 18 | 10001101 | 141 | 134 | 11110000 | 240 | 251 | 01100010 | 98 | 141 |
| 00101011 | 43 | 21 | 10001110 | 142 | 138 | 00000111 | 7 | 1 | 01100100 | 100 | 146 |
| 00101101 | 45 | 25 | 10010011 | 147 | 142 | 00001011 | 11 | 4 | 01101000 | 104 | 150 |
| 00101110 | 46 | 29 | 10010101 | 149 | 145 | 00001101 | 13 | 9 | 01110000 | 112 | 154 |
| 00110011 | 51 | 32 | 10010110 | 150 | 149 | 00001110 | 14 | 13 | 10000011 | 131 | 159 |
| 00110101 | 53 | 36 | 10011001 | 153 | 153 | 00010011 | 19 | 19 | 10000101 | 133 | 164 |
| 00110110 | 54 | 40 | 10011010 | 154 | 156 | 00010101 | 21 | 22 | 10000110 | 134 | 168 |
| 00111001 | 57 | 43 | 10011100 | 156 | 160 | 00010110 | 22 | 27 | 10001001 | 137 | 173 |
| 00111010 | 58 | 47 | 10100011 | 163 | 163 | 00011001 | 25 | 31 | 10001010 | 138 | 177 |
| 00111100 | 60 | 51 | 10100101 | 165 | 167 | 00011010 | 26 | 37 | 10001100 | 140 | 183 |
| 01000111 | 71 | 54 | 10100110 | 166 | 171 | 00011100 | 28 | 41 | 10010001 | 145 | 186 |
| 01001011 | 75 | 58 | 10101001 | 169 | 174 | 00100011 | 35 | 45 | 10010010 | 146 | 191 |
| 01001101 | 77 | 61 | 10101010 | 170 | 178 | 00100101 | 37 | 50 | 10010100 | 148 | 195 |
| 01001110 | 78 | 65 | 10101100 | 172 | 182 | 00100110 | 38 | 55 | 10011000 | 152 | 201 |
| 01010011 | 83 | 69 | 10110001 | 177 | 185 | 00101001 | 41 | 59 | 10100001 | 161 | 205 |
| 01010101 | 85 | 72 | 10110010 | 178 | 189 | 00101010 | 42 | 63 | 10100010 | 162 | 209 |
| 01010110 | 86 | 76 | 10110100 | 180 | 193 | 00101100 | 44 | 68 | 10100100 | 164 | 215 |
| 01011001 | 89 | 80 | 10111000 | 184 | 196 | 00110001 | 49 | 73 | 10101000 | 168 | 219 |
| 01011010 | 90 | 83 | 11000011 | 195 | 200 | 00110010 | 50 | 77 | 10110000 | 176 | 223 |
| 01011100 | 92 | 87 | 11000101 | 197 | 204 | 00110100 | 52 | 81 | 11000001 | 193 | 227 |
| 01100011 | 99 | 91 | 11000110 | 198 | 207 | 00111000 | 56 | 86 | 11000010 | 194 | 232 |
| 01100101 | 101 | 94 | 11001001 | 201 | 211 | 01000011 | 67 | 92 | 11000100 | 196 | 237 |
| 01100110 | 102 | 98 | 11001010 | 202 | 214 | 01000101 | 69 | 95 | 11001000 | 200 | 241 |
| 01101001 | 105 | 102 | 11001100 | 204 | 218 | 01000110 | 70 | 100 | 11010000 | 208 | 245 |
| 01101010 | 106 | 105 | 11010001 | 209 | 222 | 01001001 | 73 | 104 | 11100000 | 224 | 250 |
| 01101100 | 108 | 109 | 11010010 | 210 | 225 | 01001010 | 74 | 110 | 00011111 | 31 | 2 |
| 01110001 | 113 | 112 | 11010100 | 212 | 229 | 01001100 | 76 | 113 | 00101111 | 47 | 5 |

FIG. 16

| CODE | OLD | NEW | CODE | OLD | NEW | CODE | OLD | NEW | CODE | OLD | NEW |
|---|---|---|---|---|---|---|---|---|---|---|---|
| 00110111 | 55 | 11 | 10111010 | 186 | 155 | 00100001 | 33 | 97 | 11010111 | 216 | 135 |
| 00111011 | 59 | 15 | 10111100 | 188 | 161 | 00100010 | 34 | 103 | 11011011 | 219 | 140 |
| 00111101 | 61 | 20 | 11000111 | 199 | 165 | 00100100 | 36 | 115 | 11011101 | 221 | 152 |
| 00111110 | 62 | 23 | 11001011 | 203 | 169 | 00101000 | 40 | 121 | 11011110 | 222 | 158 |
| 01001111 | 79 | 28 | 11001101 | 205 | 175 | 00110000 | 48 | 130 | 11011111 | 231 | 170 |
| 01010111 | 87 | 33 | 11001110 | 206 | 179 | 01000001 | 65 | 139 | 11101011 | 235 | 180 |
| 01011011 | 91 | 38 | 11010011 | 211 | 184 | 01000010 | 66 | 148 | 11101101 | 237 | 190 |
| 01011101 | 93 | 42 | 11010101 | 213 | 187 | 01000100 | 68 | 157 | 11101110 | 238 | 198 |
| 01011110 | 94 | 46 | 11010110 | 214 | 192 | 01001000 | 72 | 166 | 11110011 | 243 | 208 |
| 01100111 | 103 | 52 | 11011001 | 217 | 197 | 01010000 | 80 | 176 | 11110101 | 245 | 213 |
| 01101011 | 107 | 56 | 11011010 | 218 | 202 | 01100000 | 96 | 188 | 11110110 | 246 | 226 |
| 01101101 | 109 | 60 | 11011100 | 220 | 206 | 10000001 | 129 | 194 | 11111001 | 249 | 231 |
| 01101110 | 110 | 64 | 11100011 | 227 | 210 | 10000010 | 130 | 203 | 11111010 | 250 | 243 |
| 01110011 | 115 | 70 | 11100101 | 229 | 216 | 10000100 | 132 | 212 | 11111100 | 252 | 249 |
| 01110101 | 117 | 74 | 11100110 | 230 | 220 | 10001000 | 136 | 221 | 00000001 | 1 | 17 |
| 01110110 | 118 | 78 | 11101001 | 233 | 224 | 10010000 | 144 | 230 | 00000010 | 2 | 35 |
| 01111001 | 121 | 82 | 11101010 | 234 | 228 | 10100000 | 160 | 239 | 00000100 | 4 | 71 |
| 01111010 | 122 | 88 | 11101100 | 236 | 234 | 11000000 | 192 | 248 | 00001000 | 8 | 108 |
| 01111100 | 124 | 93 | 11110001 | 241 | 238 | 00111111 | 63 | 8 | 00010000 | 16 | 144 |
| 10001111 | 143 | 96 | 11110010 | 242 | 242 | 01011111 | 95 | 16 | 00100000 | 32 | 162 |
| 10010111 | 151 | 101 | 11110100 | 244 | 246 | 01101111 | 111 | 26 | 01000000 | 64 | 199 |
| 10011011 | 155 | 106 | 11111000 | 248 | 252 | 01110111 | 119 | 34 | 10000000 | 128 | 235 |
| 10011101 | 157 | 111 | 00000011 | 3 | 8 | 01111011 | 123 | 44 | 01111111 | 127 | 53 |
| 10011110 | 158 | 114 | 00000101 | 5 | 12 | 01111101 | 125 | 49 | 10111111 | 191 | 89 |
| 10100111 | 167 | 119 | 00000110 | 6 | 24 | 01111110 | 126 | 62 | 11011111 | 223 | 90 |
| 10101011 | 171 | 124 | 00001001 | 9 | 30 | 10011111 | 159 | 67 | 11101111 | 239 | 126 |
| 10101101 | 173 | 129 | 00001010 | 10 | 39 | 10101111 | 175 | 79 | 11110111 | 247 | 172 |
| 10101110 | 174 | 133 | 00001100 | 12 | 48 | 10110111 | 183 | 85 | 11111011 | 251 | 181 |
| 10110011 | 179 | 137 | 00010001 | 17 | 57 | 10111011 | 187 | 99 | 11111101 | 253 | 217 |
| 10110101 | 181 | 143 | 00010010 | 18 | 66 | 10111101 | 189 | 107 | 11111110 | 254 | 253 |
| 10110110 | 182 | 147 | 00010100 | 20 | 75 | 10111110 | 190 | 117 | 0000000 | 0 | 254 |
| 10111001 | 185 | 151 | 00011000 | 24 | 84 | 11001111 | 207 | 125 | 11111111 | 255 | 255 |

FIG. 17

| NEW CODE | PIXEL VALUE CORRESPONDING TO NEW CODE |
|---|---|
| 00111111 | 8 |
| 01011111 | 16 (PIXEL OF INTEREST) |
| 01101111 | 26 |
| 01110111 | 34 |
| 01111011 | 44 |
| 01111101 | 49 |
| 01111110 | 62 |
| 10011111 | 67 |
| 10101111 | 79 |
| 10110111 | 85 |
| 10111011 | 99 |
| 10111101 | 107 |
| 10111110 | 117 |
| 11001111 | 125 |
| 11010111 | 135 |
| 11011011 | 140 |
| 11011101 | 152 |
| 11011110 | 158 |
| 11100111 | 170 |
| 11101011 | 180 |
| 11101101 | 190 |
| 11101110 | 198 |
| 11110011 | 208 |
| 11110101 | 213 |
| 11110110 | 226 |
| 11111001 | 231 |
| 11111010 | 243 |
| 11111100 | 249 |

FIG. 18

| NEW CODE | PIXEL VALUE CORRESPONDING TO NEW CODE | MARGIN OF ERROR (ABSOLUTE VALUE) | CORRECTION CODE |
|---|---|---|---|
| 01011111 | 16 (PIXEL OF INTEREST) | 1 | 0 |
| 00111111 | 8 | 9 | 1 |
| 01101111 | 26 | 9 | 2 |
| 01110111 | 34 | 17 | 3 |
| 01111011 | 44 | 27 | 4 |
| 01111101 | 49 | 32 | 5 |
| 01111110 | 62 | 45 | 6 |
| 10011111 | 67 | 50 | 7 |
| 10101111 | 79 | 62 | 8 |
| 10110111 | 85 | 68 | 9 |
| 10111011 | 99 | 82 | 10 |
| 10111101 | 107 | 92 | 11 |
| 10111110 | 117 | 100 | 12 |
| 11001111 | 125 | 108 | 13 |
| 11010111 | 135 | 118 | 14 |
| 11011011 | 140 | 123 | 15 |
| 11011101 | 152 | 135 | 16 |
| 11011110 | 158 | 141 | 17 |
| 11100111 | 170 | 153 | 18 |
| 11101011 | 180 | 163 | 19 |
| 11101101 | 190 | 173 | 20 |
| 11101110 | 198 | 181 | 21 |
| 11110011 | 208 | 191 | 22 |
| 11110101 | 213 | 186 | 23 |
| 11110110 | 226 | 209 | 24 |
| 11111001 | 231 | 214 | 25 |
| 11111010 | 243 | 226 | 26 |
| 11111100 | 249 | 232 | 27 |

FIG. 19

| NEW CODE | PIXEL VALUE CORRESPONDING TO NEW CODE | MARGIN OF ERROR (ABSOLUTE VALUE) | CORRECTION CODE |
|---|---|---|---|
| 00111111 | 8 | 0 | 0 |
| 01011111 | 16 (PIXEL OF INTEREST) | 8 | 1 |
| 01101111 | 26 | 18 | 2 |
| 01110111 | 34 | 26 | 3 |
| 01111011 | 44 | 36 | 4 |
| 01111101 | 49 | 41 | 5 |
| 01111110 | 62 | 54 | 6 |
| 10011111 | 67 | 59 | 7 |
| 10101111 | 79 | 71 | 8 |
| 10110111 | 85 | 77 | 9 |
| 10111011 | 99 | 91 | 10 |
| 10111101 | 107 | 99 | 11 |
| 10111110 | 117 | 109 | 12 |
| 11001111 | 125 | 117 | 13 |
| 11010111 | 135 | 127 | 14 |
| 11011011 | 140 | 132 | 15 |
| 11011101 | 152 | 144 | 16 |
| 11011110 | 158 | 150 | 17 |
| 11100111 | 170 | 162 | 18 |
| 11101011 | 180 | 172 | 19 |
| 11101101 | 190 | 182 | 20 |
| 11101110 | 198 | 190 | 21 |
| 11110011 | 208 | 200 | 22 |
| 11110101 | 213 | 205 | 23 |
| 11110110 | 226 | 218 | 24 |
| 11111001 | 231 | 223 | 25 |
| 11111010 | 243 | 235 | 26 |
| 11111100 | 249 | 241 | 27 |

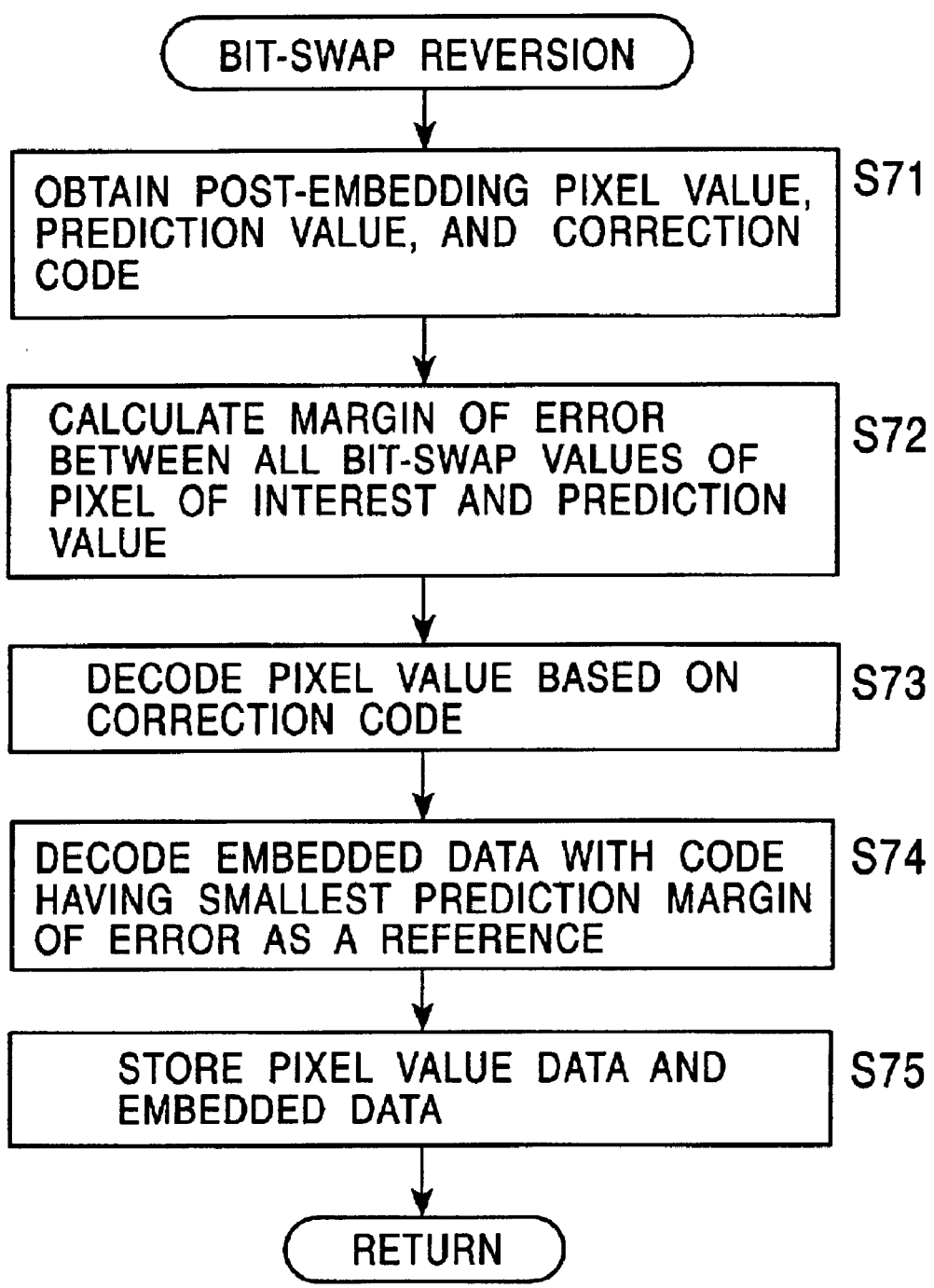

FIG. 28A

IMAGE A

| | AMOUNT OF INFORMATION THAT CAN BE EMBEDDED [bit/pixel] | AMOUNT OF CORRECTION CODE DATA [bit/pixel] | DIFFERENCE [bit/pixel] |
|---|---|---|---|
| R | 4.94 | 3.43 | 1.51 |
| G | 5.09 | 3.57 | 1.52 |
| B | 5.06 | 3.73 | 1.33 |

IMAGE B

| | AMOUNT OF INFORMATION THAT CAN BE EMBEDDED [bit/pixel] | AMOUNT OF CORRECTION CODE DATA [bit/pixel] | DIFFERENCE [bit/pixel] |
|---|---|---|---|
| R | 4.70 | 2.53 | 2.18 |
| G | 5.06 | 2.68 | 2.38 |
| B | 5.03 | 2.61 | 2.41 |

FIG. 28B

IMAGE A

| | AMOUNT OF INFORMATION THAT CAN BE EMBEDDED [bit/pixel] | AMOUNT OF CORRECTION CODE DATA [bit/pixel] | DIFFERENCE [bit/pixel] |
|---|---|---|---|
| R | 4.93 | 2.99 | 1.94 |
| G | 4.93 | 3.16 | 1.76 |
| B | 4.93 | 3.38 | 1.55 |

IMAGE B

| | AMOUNT OF INFORMATION THAT CAN BE EMBEDDED [bit/pixel] | AMOUNT OF CORRECTION CODE DATA [bit/pixel] | DIFFERENCE [bit/pixel] |
|---|---|---|---|
| R | 4.89 | 2.00 | 2.89 |
| G | 4.93 | 2.16 | 2.77 |
| B | 4.93 | 2.10 | 2.83 |

DATA PROCESSING APPARATUS AND DATA PROCESSING METHOD, DECODING APPARATUS AND METHOD THEREOF, AND RECORDING MEDIUM

BACKGROUND OF THE INVENTION

1. Field of the Invention

The present invention relates to a data processing apparatus and data processing method, and to a recording medium, and particularly relates to a data processing apparatus and data processing method and recording medium enabling data embedding with high decoding precision, for example.

2. Description of the Related Art

FIG. 1 illustrates the configuration of an example of a conventional embedded coding apparatus which embeds data in pixels (pixel values) configuring an image, by performing bit-swapping, wherein bits making up bit strings representing pixels are swapped.

Art relating to bit-swapping has already been filed with the United States Patent and Trademark Office (USPTO) on Jun. 6, 2000, by the present Assignee, as Ser. No. 09/587,838.

Image data is supplied to image data memory 1, and the image data memory 1 temporarily stores the image data supplied thereto. Also, data to be embedded in the image data (hereafter also referred to as "embedding data") is supplied to embedding data memory 2, and the embedding data memory 2 temporarily stores the data to be embedded, supplied thereto.

A bit-swap embedding unit 3 sequentially, e.g., in raster scan order, takes pixels making up the image data stored in the image data memory 1, as pixels of interest, and reads out the pixel value thereof, and also reads out the data to be embedded which is stored in the embedding data memory 2. Further, the bit-swap embedding unit 3 performs bit-swapping of the bits making up the bit string representing the pixel value of the pixel of interest according to the data to be embedded, thereby embedding the data to be embedded in the pixel value of the pixel of interest, and supplies the pixel value obtained as the result of the embedding (hereafter also referred to as "post-embedding pixel value") to post-embedding image data memory 4.

The post-embedding image data memory 4 stores the post-embedding pixel value supplied from the bit-swap embedding unit 3 at an address corresponding to the position of the pixel of interest, and in the event that post-embedding pixel values for one frame are stored, for example, outputs image data made up of the one frame of post-embedding pixel values (hereafter also referred to as "post-embedding image data").

Next, the processing of the embedding coding apparatus (embedding coding processing) shown in FIG. 1 will be described with reference to the flowchart shown in FIG. 2.

In the event that the embedding coding apparatus is provided with, for example, one frame (or field) of image data and data to be embedded in that one frame of image data, the image data memory 1 stores the image data and the embedding data memory 2 stores the data to be embedded in step S1.

The flow then proceeds to step S2, where, in raster scan order, the bit-swap embedding unit 3 takes, of the pixels making up the image data stored in the image data memory 1, as pixel of interest, pixels that have not yet been made pixel of interest. The bit-swap embedding unit 3 reads out the pixel value thereof, and also reads out the data to be embedded from the embedding data memory 2, of an amount equivalent to the number of bits which can be embedded in the pixel value. Further, in step S2, the bit-swap embedding unit 3 performs bit-swapping of the bits making up the bit string representing the pixel value of the pixel of interest, according to the data to be embedded, thereby embedding the data to be embedded in the pixel value of the pixel of interest, and supplies the post-embedding pixel value obtained as a result of this embedding to the post-embedding image data memory 4, where it is stored.

Subsequently, the flow proceeds to step S3, the bit-swap embedding unit 3 judges whether or not all pixels making up the image data stored in the image data memory 1 have been subjected to processing as pixel of interest, and in the event that judgment is made that not all pixels have been processed as pixel of interest, the flow returns to step S2.

Also, in step S3, in the event that that judgment is made that all pixels making up the image data stored in the image data memory 1 have been processed as pixel of interest, i.e., in the event that the image data made up of the post-embedding pixel values for one frame (post-embedding image data) has been stored in the post-embedding image data memory 4, the flow proceeds to step S4, and the post-embedding image data memory 4 outputs the post-embedding image data stored therein, thereby ending the processing thereof.

The processing of the flowchart shown in FIG. 2 is preformed for one frame of image data each time one frame of image data is supplied to the embedded coding apparatus.

According to such embedded coding processing, data to be embedded is embedded in pixel values, as shown in FIG. 3, for example.

That is, FIG. 3 illustrates a case wherein the pixel value of the pixel of interest is 16, and data to be embedded with a value of 3 is to be embedded in the pixel of interest.

For example, saying that 8 bits are appropriated to the pixel value (the same holding true for the following description as well), the pixel value "16", is generally represented as "00010000" in binary code. Accordingly, the bit string obtained by bit-swapping the binary code "00010000" can only be one of the eight patterns shown in FIG. 3. With regard to the bit strings making up the binary code corresponding to the pixel value, the bit-swap embedding unit 3 correlates and stores the swapping pattern of the bits making up the bit string (the bit-swap pattern) with the data to be embedded, and the binary code representing the pixel value of the pixel of interest is subjected to bit-swapping according to the pattern correlated with the embedding data which is to be embedded in the pixel of interest.

In FIG. 3, the eight bit-swap patterns obtained by performing bit-swapping of the binary code "00010000" representing the pixel value "16", i.e., "00010000", "00100000", "01000000", "10000000", "00000001", "00000010", "00000100", and "00001000", are each correlated with the data to be embedded "0", "1", "2", "3", "4", "5", "6", and "7", and accordingly, in the event that the data to be embedded is "3", the bit-swap embedding unit 3 performs bit-swapping of the binary code "00010000" representing the pixel value "16" with the binary code "10000000" correlated with "3", and the pixel value "128" represented by the binary code "10000000" as the result of bit-swapping is output as the post-embedding pixel value.

According to the above, in the event of embedding data to be embedded in a pixel value by bit-swapping, how much data to be embedded that can be embedded in a pixel value is governed by the number of 0s or 1s in the bit string making up the binary code representing the pixel value.

That is to say, the amount of information which can be embedded in the pixel value is governed by the total number of bit-swap patterns of the binary code representing the pixel value, and with the total number of bit-swap patterns represented by N, the amount of information which can be embedded in the pixel value is $\log_2 N$ bits. Now, FIG. 4 illustrates the relation between the number of 0s or 1s and the amount of information which can be embedded, with regard to 8-bit binary code.

Next, FIG. 5 illustrates the configuration of an example of a decoding apparatus for decoding the original pixel value and embedded data, from the post-embedding image data which is output from the embedded coding apparatus shown in FIG. 1.

The post-embedding image data is supplied to post-embedding image data memory 11, and the post-embedding image data memory 11 temporarily stores the post-embedding image data supplied thereto.

A bit-swap reverting unit 12 sequentially, e.g., in raster scan order, takes pixels making up the post-embedding image data stored in the post-embedding image data memory 11, as pixels of interest, reads out the post-embedding pixel value of the pixel of interest from the post-embedding image data memory 11, and also obtains a prediction value for the pixel value of the pixel of interest from a prediction value obtaining unit 15. Further, the bit-swap reverting unit 12 performs bit-swapping of the bits making of the bit string representing the post-embedding image value of the pixel of interest according to the prediction value of the pixel of interest, thereby decoding the pixel value of the pixel of interest, and also decoding the embedded data that was embedded in the pixel of interest. Note that the pixel value of the pixel of interest that has been decoded is supplied from the bit-swap reverting unit 12 to image data memory 13, and the embedding data is supplied from the bit-swap reverting unit 12 to embedded data memory 14.

Image data memory 13 temporarily stores the pixel value of the decoded pixel of interest supplied from the bit-swap reverting unit 12 at the address corresponding to the position of the pixel of interest. The embedded data memory 14 temporarily stores the decoded embedded data supplied from the bit-swap reverting unit 12.

The prediction value obtaining unit 15 obtains the prediction value of the pixel of interest based on the already-decoded pixel values stored in the image data memory 13, and supplies this to the bit-swap reverting unit 12.

Note that with the prediction value obtaining unit 15, of the already-decoded pixel values stored in the image data memory 13 for example, the pixel values adjacent to the pixel of interest above or to the left thereof, can be used without change as a prediction value. Or, with the prediction value obtaining unit 15, of the already-decoded pixel values stored in the image data memory 13 for example, an average value of the pixel values of the pixels positioned close to the pixel of interest either spatially or time-wise can be obtained that this average value used as the prediction value.

Next, the processing of the decoding apparatus shown in FIG. 5 (decoding processing) will be described with reference to the flowchart shown in FIG. 6.

In the event that, for example, one frame (or field) of post-embedding image data is supplied to the decoding apparatus, the post-embedding image data memory 11 stores the post-embedding image data in step s11.

Subsequently, the bit-swap reverting unit 12 sequentially, e.g., in raster scan order, takes, of the pixels making up the post-embedding image data stored in the post-embedding image data memory 11, as pixel of interest, pixels that have not yet been made pixel of interest. In step S12, the prediction value obtaining unit 15 obtains the prediction value of the pixel of interest based on already-decoded pixel values stored in the image data memory 13, and supplies the prediction value to the bit-swap reverting unit 12.

The bit-swap reverting unit 12 reads out the post-embedding pixel value of the pixel of interest from the post-embedding image data memory 11, receives the prediction value of the pixel value of the pixel of interest from the prediction value obtaining unit 15, and in step S13, decodes the pixel value of the pixel of interest by performing bit-swapping of the bits making up the bit string representing the post-embedding pixel value of the pixel of interest according to the prediction value of the pixel of interest, and also decodes the embedded data that was embedded in the pixel of interest, and the flow proceeds to step S14.

In step S14, the bit-swap reverting unit 12 supplies the decoded value of the pixel value of the pixel of interest to the image data memory 13 where it is stored, and also supplies the decoded value of the embedded data to the embedded data memory 14 where it is stored, and the flow proceeds to step S15.

In step S15, the bit-swap reverting unit 12 judges whether or not all pixels making up the post-embedding image data stored in the post-embedding image data memory 11 have been subjected to processing as pixel of interest, and in the event that judgment is made that not all pixels have been processed as pixel of interest, the flow returns to step S12, with a pixel that has not yet been made a pixel of interest as a new pixel of interest, in raster scan order.

Also, in step S15, in the event that that judgment is made that all pixels making up the post-embedding image data stored in the post-embedding image data memory 11 have been processed as pixel of interest, i.e., in the event that the one frame of pixel values making up the image data is stored in the image data memory 13, and also one frame of pixel values making up the embedded data embedded in the image data is stored the embedded data memory 14, the flow proceeds to step S16, the image data (or rather the decoded value thereof) stored in the image data memory 13 is output therefrom, while the embedded data (or rather the decoded value thereof) stored in the embedded data memory 14 is output therefrom, and the processing ends.

Note that the processing of the flowchart shown in FIG. 6 is preformed for one frame of post-embedding image data each time one frame of post-embedding image data is supplied to the decoding apparatus.

According to such decoding processing, the post-embedding pixel values are decoded into pixel values and embedded data, as shown in FIG. 7, for example.

That is, as described with reference to FIG. 3, FIG. 7 illustrates a case of decoding the post-embedding pixel value "128" obtained by embedding data to be embedded with a value of "3" into a pixel value of "16".

The binary code representing the post-embedding pixel value "128" is "10000000", and this binary code is obtained by performing bit-swapping on the binary code representing the original pixel value, so the binary code representing the original pixel value exists with the all of the bit string patterns obtained by performing bit-swapping on the binary code "10000000" representing the post-embedding pixel value "128". Accordingly finding the binary code representing the original pixel value from the all of the bit string patterns obtained by performing bit-swapping on the binary code "10000000"representing the post-embedding pixel value "128" decodes the original pixel value.

Also, the binary code corresponding to the original pixel value is made to be a post-embedding pixel value by performing bit-swapping according to the bit-swap pattern corresponding to the data to be embedded, so once the bit-swap pattern for making the binary code representing the post-embedding pixel value into the binary code representing the original pixel value is found, the embedded data embedded in the post-embedding pixel value can be decoded.

Thus, in order to decode the pixel value, the bit-swap reverting unit 12 first performs bit-swapping of the binary code "10000000" representing the post-embedding pixel value "128", thereby obtaining bit strings of all patterns obtained from that binary code. Further, the bit-swap reverting unit 12 finds the bit string of a pattern wherein the prediction margin of error of the prediction value of for the pixel of interest from the prediction value obtaining unit is smallest as to the pixel value indicated by each bit string pattern. That is to say, in the event that the prediction value for the pixel of interest output by the prediction value obtaining unit 15 is "14", of the pixel values represented by the eight bit string patterns shown in FIG. 7 obtained from the binary code "10000000" representing the post-embedding pixel value "128", that with the smallest prediction margin of error with the prediction value "14" is "16", so this pixel value "16" is decoded as the original pixel value.

Also, the bit-swap reverting unit 12 stores correlating information for correlating the bit-swap-pattern and embedded data which is the same as with the bit-swap embedding unit 3, and based on this correlating information, decodes the embedded data "3" correlated to the bit-swap pattern for bit-swapping the binary code "0000100" representing the decoded pixel value "16" into the binary code "10000000" representing the post-embedding pixel value "128" as the embedded data embedded in the pixel value "16" of the pixel of interest.

Thus, the post-embedding pixel value "128" is decoded as the original pixel value "16" and the embedded data "3" embedded therein.

Now, in the event that the post-embedding image data is being decoding in raster scan order for example, and the pixel value of the pixel adjacent to the pixel of interest to the left is used without change as the prediction value of the pixel of interests, this means that there is no pixel value existing as a prediction value of the pixels at the far left of the post-embedding image data. Accordingly, an arrangement may be employed wherein, for example, no data to be embedded is embedded in pixels at the far left of the post-embedding image data at the time of coding, and also the pixels to the right of the pixels at the far left of the post-embedding image data become the object of decoding at the time of decoding.

Now, the decoding apparatus shown in FIG. 5 performs decoding of the pixel value and embedded data, presupposing that the prediction margin of error of the prediction value of the pixel value of the pixel of interest is small.

Accordingly, as described with reference to FIG. 7, in the event that a prediction value "14" relatively precisely predicting the original pixel value "16" is obtained in the case of decoding the post-embedding pixel value "128" obtained by embedding data with a value of "3" in a pixel value "16", the post-embedding pixel value "128" can be accurately decoded to the original pixel value "16".

However, even in cases wherein the prediction value precision is relatively good, it may be difficult to accurately decode the post-embedding pixel value into the original pixel value if the original pixel value is small. Further, with the decoding apparatus shown in FIG. 5, the embedded data decoded based on the bit-swap pattern with which the binary code indicating the original pixel value is bit-swapped into the binary code representing the post-embedding pixel value cannot be accurately decoded, unless the pixel value can be accurately decoded.

Specifically, in the event that the pixel value of the pixel of interest is small, let us say, "2", this cannot be accurately decoded even if a relatively accurate "1" is obtained as the prediction value for the pixel of interest.

That is to say, the binary code for the pixel value of the pixel of interest "2" is "00000010", so there are eight patterns for the bit-swap pattern of this binary code as with the case shown in FIG. 7, and the embedded encoding makes a post-embedding pixel value representing one of the bit strings of the eight patterns. Then, at the time of decoding the post-embedding pixel value, even in the event that the "1" is obtained as the prediction value with a relatively high prediction precision (a prediction value close to the original pixel value "2") is obtained as described above, the bit string of the eight patterns with only one bit of "1" shown in FIG. 7 which makes the prediction margin of error of the prediction value "1" smallest is the binary code representing "00000001" "1", so the post-embedding pixel value "2" is decoded to the pixel value "1" represented by the binary code "00000001", and is not decoded to the original pixel value "2".

Thus, the state wherein pixel values with small values cannot be accurately decoded even in the event that a relatively accurate prediction value is obtained, is due to the binary code appropriated to the pixel values.

That is, considering the 8-bit binary codes wherein there is, for example, only one bit of "1" (and thus 7 bits of "0"), there are eight bit-swap patterns for such binary code as shown in FIG. 7, but the pixel values which the eight patterns of binary code, "00000001", "00000010", "00000100", "00001000", "00010000", "00100000", "01000000", and "10000000", represent, are "1", "2", "14", "8"1, "116", 1"32", "64", and "128". The intervals between the pixel values corresponding to these eight patterns of binary code are fine at some places and coarse at others. In other words, the intervals between pixel values are great at portions where the pixel value is great, and the intervals between pixel values are small at portions where the pixel value is small.

Accordingly, with regard to pixel values which have fine intervals, such as "1", "2", "4", and so forth, even in the event that a prediction value is obtained with relatively high precision, the prediction value of that pixel value is makes the prediction margin of error as to other pixel values near that pixel value to be the smallest, and often does not make the prediction margin of error as to the true pixel value to be the smallest. Consequently, the pixel value is not accurately decoded, as described above.

SUMMARY OF THE INVENTION

The present invention has been made in light of the above problems, and accordingly, it is an object of the present invention to enable data embedding with high decoding accuracy.

According to a first aspect of the present invention, a data processing apparatus for embedding second digital data in first digital data comprises: bit-swap means for bit-swapping target data comprising a predetermined number of bits within the first digital data; predicting means for outputting a prediction value which predicts a value corresponding to the target data from marginal data surrounding the target data; sorting means for sorting target data subjected to the bit-swapping according to the prediction margin of error value between a prediction value output by the predicting means and respective values corresponding to target data subjected to the bit-swapping; correction code output means for outputting correction code according to target data subjected to the bit-swapping that has been sorted by the sorting means; and embedded data output means for outputting, as embedded data, one of the target data subjected to the bit-swapping that has been sorted by the sorting means, according to the second digital data.

Also, according to another aspect of the present invention, a decoding apparatus for decoding first digital data and second digital data from embedded data wherein the second digital data is embedded in the first digital data and from a correction code, comprises: bit-swap means for bit-swapping target data comprising a predetermined number of bits within the embedded data; predicting means for outputting a prediction value which predicts a value of decoded data decoded from the target data, from a value corresponding to decoded data surrounding the target data which has already been decoded; sorting means for sorting target data subjected to the bit-swapping according to the prediction margin of error value between a prediction value output by the predicting means and respective values corresponding to target data subjected to the bit-swapping by the bit-swap means; decoded data output means for outputting, as decoded data, one code of the bit-swapped target data sorted by the sorting means, according to the correction code; and second digital data output means for outputting second digital data according to the order of the target data, by bit-swapped target data sorted by the sorting means.

Thus, according to the present invention, a first code which is a bit string appropriated to the values of first data is converted into second code which is a bit string appropriated to the values such that the intervals between values corresponding to a bit string with the same number of 0s and 1s are uniform and coarse, and also the prediction value of first data of interest which is a first data of interest, is obtained. Performing bit-swapping wherein the bits of the second code corresponding to the first data of interest are swapped, based on the second data and the prediction value of the first data of interest, embeds the second data in the first data of interest. Accordingly data embedding can be performed with high decoding accuracy.

Also, according to the present invention, of embedded data represented by second code which is a bit string appropriated to values such that the intervals between values corresponding to a bit string with the same number of 0s and 1s is uniform, this second code having been converted from a first code which is a bit string appropriated to the values of first data, the prediction value of first data of interest which is a first data of interest, corresponding to the embedded data of interest, is obtained. Further, performing bit-swapping wherein the bits of the second code corresponding to the embedded data are swapped, based on the prediction value of the first data of interest, decodes the first data of interest represented by the second code, and also decodes the second data embedded in this first data of interest, Then, the second code representing the first data of interest is converted into first code. Accordingly, the data can be decoded with high accuracy.

BRIEF DESCRIPTION OF THE DRAWINGS

FIG. 4 is a diagram describing the relation between the number of 0s or 1s in a bit string, and the amount of data which can be embedded in that bit string;

FIGS. 14(a)–(c) is a diagram illustrating the results of embedded coding in the case of using conventional code;

FIG. 15 is a diagram illustrating the correlated relation between new code and pixel values;

FIG. 16 also is a diagram illustrating the correlated relation between new code and pixel values;

FIG. 17 is a diagram illustrating bit-swap patterns of an 8-bit string with six bits of 1;

FIG. 18 is a diagram illustrating the results of (A embedded coding using new code;

FIG. 19 also is a diagram illustrating the results of

FIG. 17 embedded coding using new code;

FIG. 27 is a flowchart describing in detail the processing in step S63 shown in FIG. 26;

FIGS. 28(*a*)–(*b*) is a diagram illustrating results of simulation carried out by the present Inventor.

DESCRIPTION OF THE PREFERRED EMBODIMENTS

The an embodiment of the present invention will now be described, but prior to this, completely-reversible embedded coding and decoding using correction code will be described.

Figure 1:
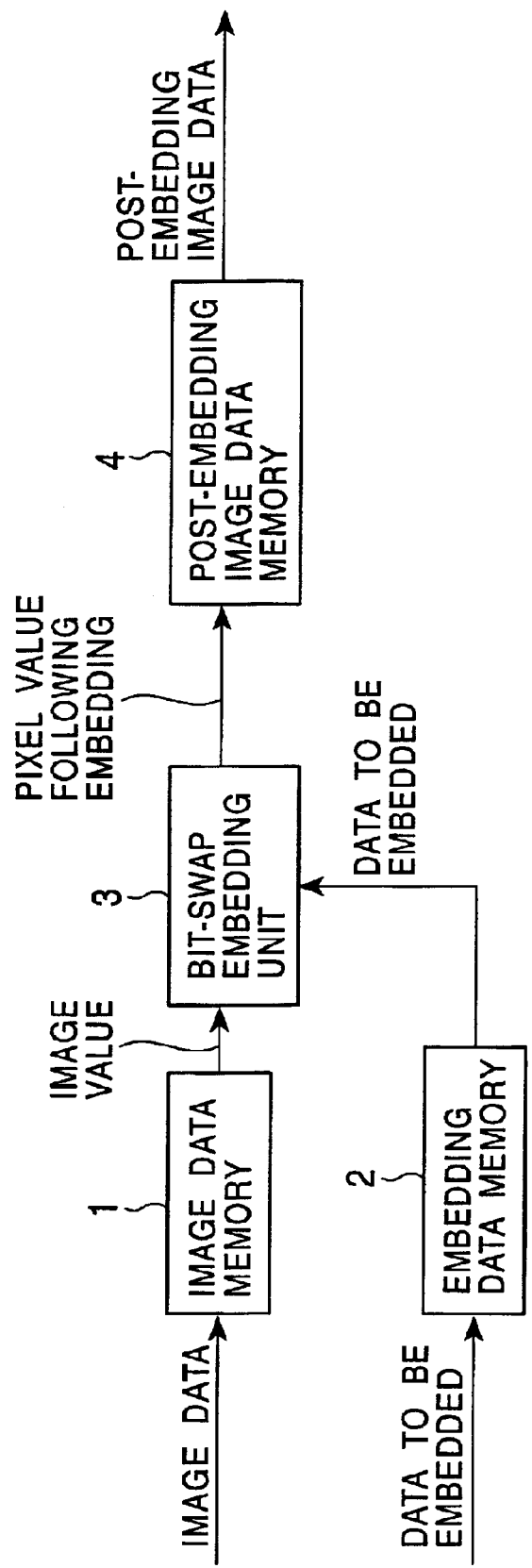
FIG. 1 is a block diagram illustrating the configuration of an example of a conventional embedded coding apparatus.
Figure 2:
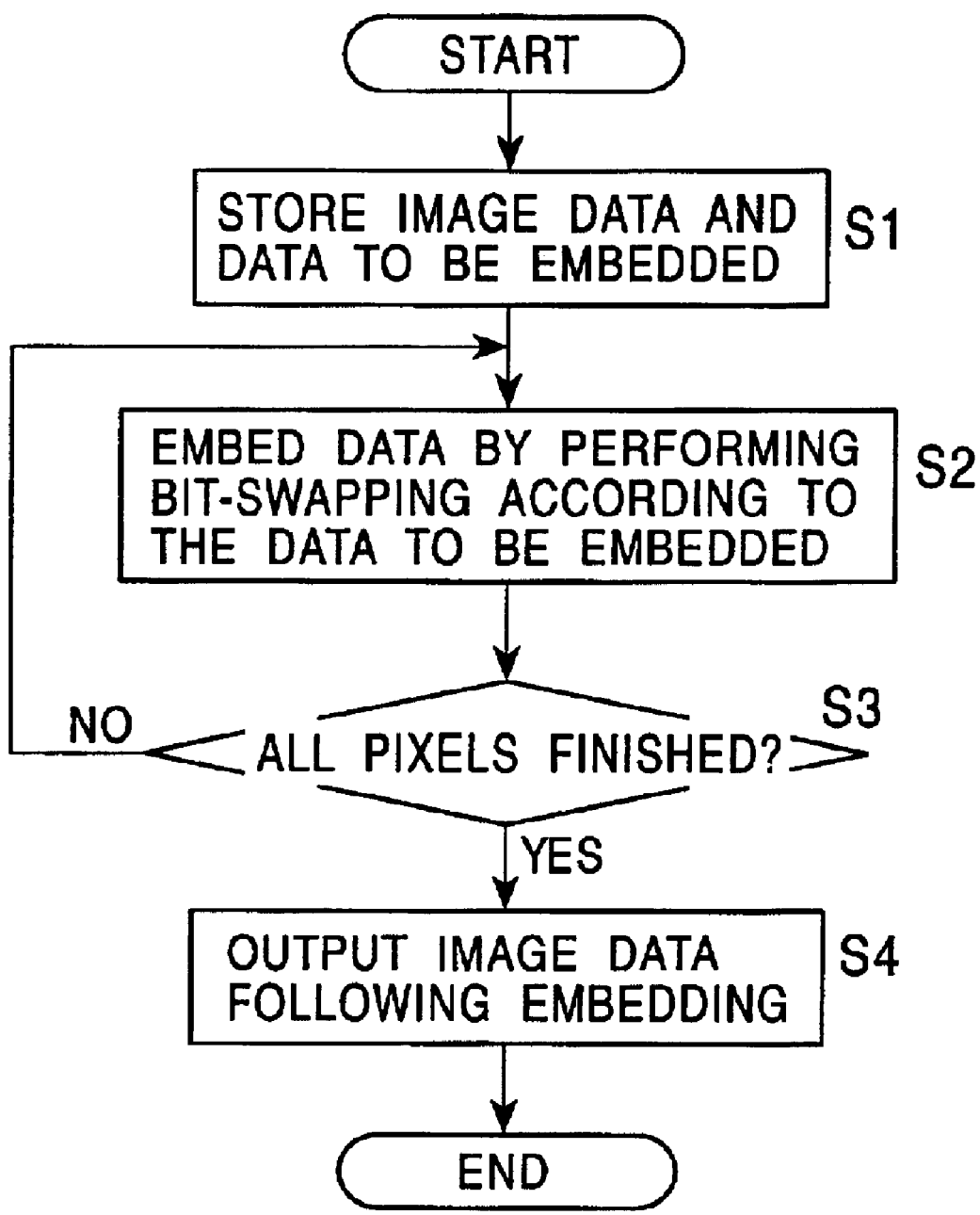
FIG. 2 is a flowchart describing the processing of the embedded coding apparatus shown in FIG. 1.
Figure 3:
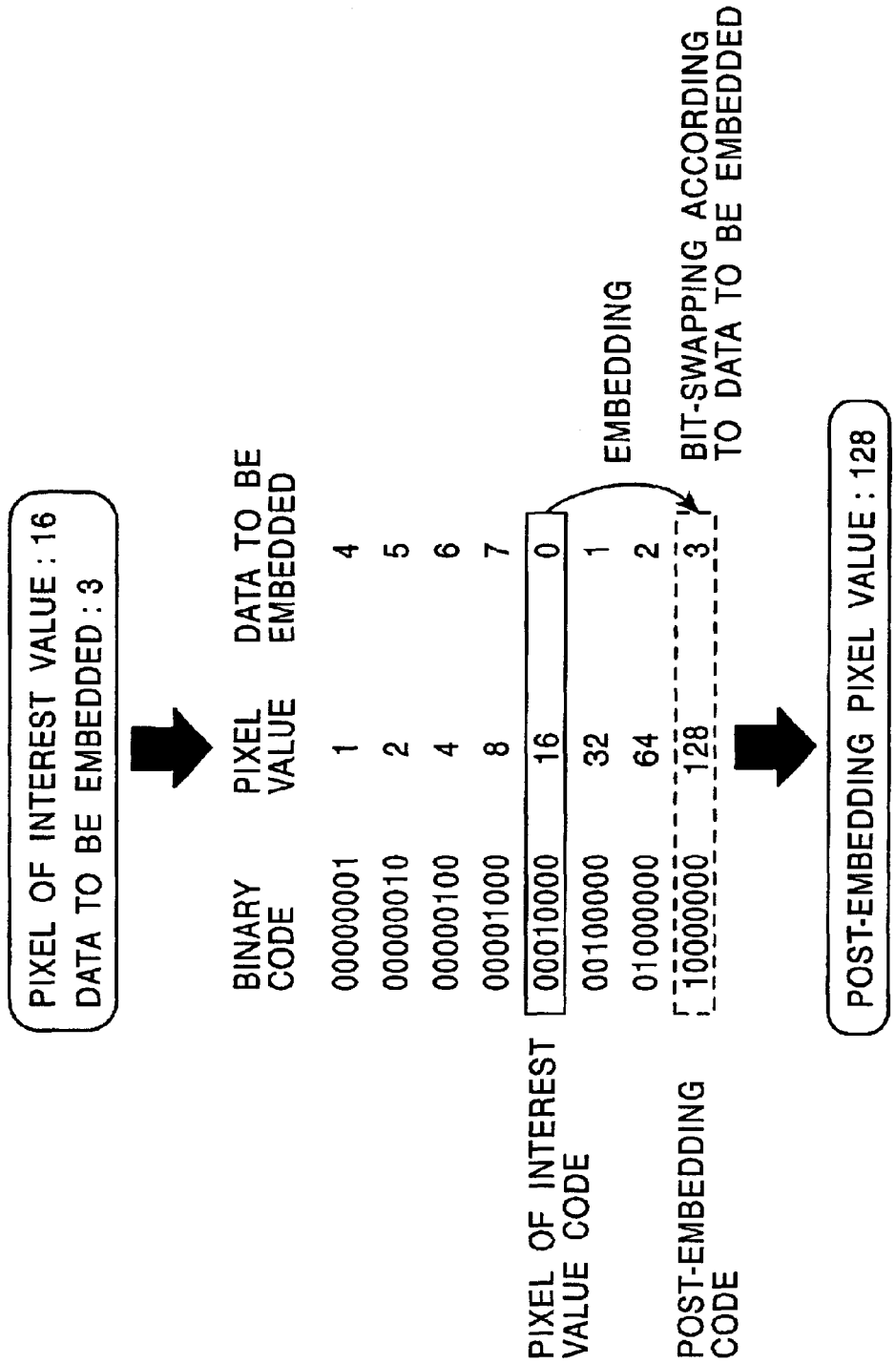
FIG. 3 is a diagram describing the process of the embedded coding apparatus shown in FIG. 1.
Figure 8:
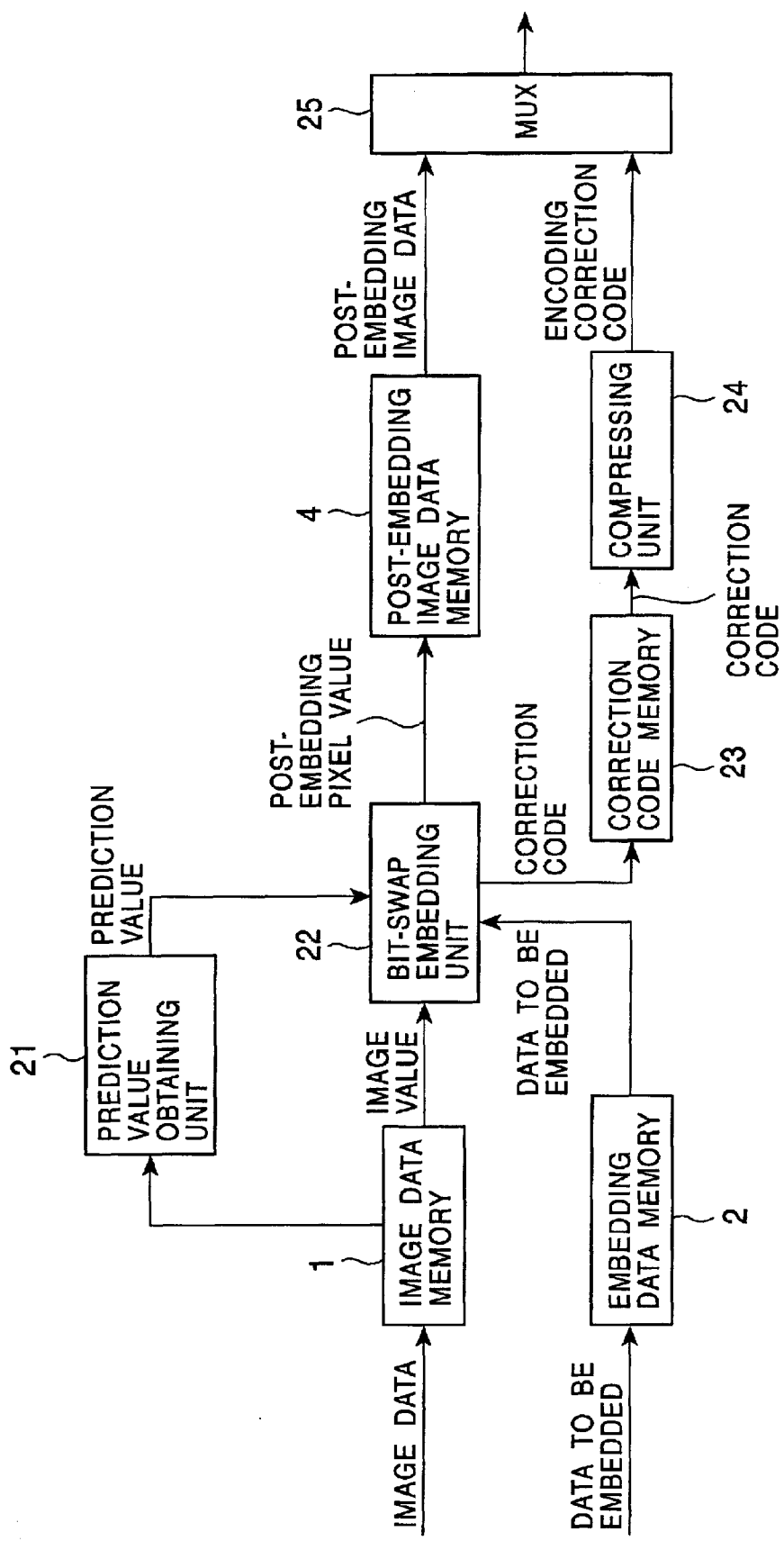
FIG. 8 is a block diagram illustrating an example of the configuration of an embodiment of an embedded coding apparatus using correction code.

FIG. 8 illustrates an example of the configuration of an embodiment of an embedded coding apparatus performing completely-reversible embedded coding using correction code. Note that the portions corresponding to FIG. 1 are denoted with the same reference numerals in the figure, and description thereof will be omitted as appropriate. With the embedded coding apparatus shown in FIG. 8, a prediction value obtaining unit 21, correction code memory 23, compressing unit 24, and MUX (multiplexer) 25 have been added, and a bit-swap embedding unit 22 has been provided instead of the bit-swap embedding unit 3; otherwise, the configuration is the same as that shown in FIG. 1.

The prediction value obtaining unit 21 obtains the prediction value for the pixel value of the pixel of interest based on image data stored in image data memory 1, and supplies this to the bit-swap embedding unit 22.

Now, as with the prediction value obtaining unit 15 described with reference to FIG. 5, with the prediction value obtaining unit 21, for example, the pixel values adjacent to the pixel of interest stored in the image data memory 1 above or to the left thereof, can be used without change as a prediction value, or an average value of the pixel values of the pixels positioned close to the pixel of interest stored in the image data memory 1 either spatially or time-wise can be obtained that this average value used as the prediction value. In the following description, the pixel value of the pixel to the left of the pixel of interest will be used as the prediction value of the pixel of interest without change, in order to facilitate simplicity in description. Also, though the pixel using for obtaining the prediction value of the pixel of interest is not restricted in particular, at the time of decoding the pixel of interest, a pixel cannot be used for calculating prediction value if it has not already been coded, so there is the need to calculate the prediction value of the pixel of interest based on the pixel value of a pixel that has already been decoded at the time of decoding.

As with the bit-swap embedding unit 3 described with reference to FIG. 1 for example, the bit-swap embedding unit 22 takes, sequentially in raster scan order, as pixels of interest, pixels making up the image data stored in the image data memory 1, reads out the pixel values thereof, and also reads out data to be embedded which is stored in the embedding data memory 2. Further, the bit-swap embedding unit 22 performs bit-swapping of the bits making up the bit string representing the pixel value of the pixel of interest, according to the data to be embedded, thereby embedding the data to be embedded in the pixel value of the pixel of interest, and supplies the pixel value obtained as the result of the embedding (hereafter also referred to as "post-embedding pixel value") to the post-embedding image data memory 4.

That is to say, the bit-swap embedding unit 22 obtains binary code as bit strings for all patterns obtained from bit strings corresponding to the binary code by performing bit-swapping of the binary code representing the pixel value of the pixel of interest, and outputs binary code, in an order corresponding to the value of the embedding data when the prediction margin of errors of the prediction values of the pixel of interest as to the pixel of interest represented by the binary code are listed in ascending order, as binary code corresponding to the post-embedding pixel value.

Further, the bit-swap embedding unit 22 supplies information representing the order of binary code representing the pixel value of the pixel of interest, when the binary code of the patterns obtained as the result of bit-swapping are listed with the margin of errors of the prediction values for the pixel of interest as to the pixel value which the binary code represents in ascending order, as correction code, and supplies this to the correction code memory 23.

Now, in the event that there is no correction code, as described with reference to FIGS. 5 through 7 with regard to the post-embedding pixel value output by the bit-swap embedding unit 22, of all binary code patterns obtained by performing bit-swapping of binary code representing the post-embedding pixel value thereof, that with the smallest prediction margin of error of the prediction value as to the value which that binary code represents is taken as the decoding results of the pixel value, but as described above, accurate decoding cannot be performed in the event that the prediction margin of error as to the original pixel value is not the smallest.

On the other hand, the correction code represents the order of binary code representing the pixel value of the pixel of interest when the binary code of all patterns obtained by performing bit-swapping of the binary code representing the post-embedding pixel value in ascending order of prediction margin of error of the prediction value of the pixel of interest as to the pixel value which the binary code represents. Accordingly, with the correction code, the original pixel value can be accurately decoded regardless of whether the prediction margin of error is great or small. Such information for performing correction is called "correction code" since, in cases wherein the pixel value with the smallest prediction margin of error is not accurate decoding results, this can be viewed as correcting the inaccurate decoding results to accurate decoding results.

The correction code memory 23 stores correction code regarding the pixel of interest from the bit-swap embedding unit 22 to an address corresponding to the position of the pixel of interest.

The compressing unit 24 reads out the correction code stored in the correction code memory 23, subjects the correction code to compressed coding by performing entropy coding processing or the like such as Huffman coding or the like, and outputs the compression coding results (hereafter also referred to as "coded correction code) to the MUX 25.

The MUX 25 multiplexes the post-embedding image data output by the post-embedding image data memory 4 and the coded correction code output by the compressing unit 24, and outputs the multiplex data obtained thereby. This multiplexed data is sent over, e.g., satellite channels, cable television networks, ground waves, the Internet, public networks, and other like sending media. Or, the multiplexed data is recorded in recording media such as optical disks, magnetic disks, phase change disks, semiconductor memory, or the like.

Next, the processing of the embedded coding apparatus shown in FIG. 8 (embedded coding processing) will be described with reference to the flowchart shown in FIG. 9.

In the event that the embedding coding apparatus is provided with, for example, one frame (or field) of image data and data to be embedded in that one frame of image data, the image data memory 1 stores the image data and the embedding data memory 2 stores the data to be embedded in step S21.

Then, the bit-swap embedding unit 22 takes, of the pixels making up the image data stored in the image data memory 1, pixels that have not yet been made a pixel of interest, as pixel of interest in raster scan order, and in step S22, the prediction value obtaining unit 21 obtains the prediction value of the pixel of interest, and supplies this to the bit-swap embedding unit 22. That is to say, the prediction value obtaining unit 21 reads out the pixel value to the left of the pixel of interest from the image data memory 1 for example, and supplies this pixel value to the bit-swap embedding unit 22 as the prediction value of the pixel of interest.

Now, in the event that correction code is not being used, and the post-embedding image data is being decoding in raster scan order as described above, using the pixel value of the pixel to the left of the pixel of interest without change as the prediction value of the pixel of interest means that there is no pixel value existing as a prediction value for the pixels at the far left of the post-embedding image data, and no decoding can be performed, so there is the need to arrange such that no data to be embedded is embedded in pixels at the far left of the image data at the time of embedding coding. However, in the case of using correction code, the pixel value can be decoded by the correction code, whatever the prediction value is. Accordingly, in the case of using correction code, data to be embedded can be embedded in the pixels at the far left as if a pixel with a predetermined pixel value (e.g., 0 or the like) exists to the left thereof.

Once the bit-swap embedding unit 22 receives the prediction value of the pixel of interest from the prediction value obtaining unit 21, in step S23 the pixel value of the pixel of interest is read out from the image data memory 1, and also the data to be embedded for the number of bits capable of being embedded in that pixel value is read out from the embedding data memory 2. Further, in step S23, the bit-swap embedding unit 22 performs bit-swapping of the bits making up the bit string representing the pixel value of the pixel of interest according to the prediction value of the pixel of interest from the prediction value obtaining unit 21 and the data to be embedded read out from the embedding data memory 2, thereby embedding the data to be embedded in the pixel value of the pixel of interest, and supplies the post-embedding pixel value obtained as the result of the embedding to the post-embedding image data memory 4, where it is stored.

Then, the flow proceeds to step S24, the bit-swap embedding unit 22 obtains the correction code for the pixel of interest, supplies this to the correction code memory 23 where it is stored, and the flow proceeds to step S25.

In step S25, the bit-swap embedding unit 22 judges whether or not processing has been performed for all pixels making up the image data stored in the image data memory 1 as the pixel of interest, and in the event that judgment is made that processing has not been performed for all pixels as the pixel of interest, the flow returns to step S22, and the same process is repeated.

Also, in the event that judgment is made in step S25 that processing has been performed for all pixels making up the image data stored in the image data memory 1 as the pixel of interest, i.e., in the event that the image data made up of the post-embedding pixel values for one frame (post-embedding image data) has been stored in the post-embedding image data memory 4, and correction code for one frame of pixels is stored in the correction code memory 23, the flow proceeds to step S26, the compressing unit 24 subjects the one frame of correction code stored in the correction code memory 23 to entropy coding, and outputs the coded correction code obtained thereby to the MUX 25.

In step S27, the MUX 25 reads out the post-embedding pixel values for one frame stored in the post-embedding image data memory 4. Further, in step S27, the MUX 25 multiplexes the post-embedding image data and the coded correction code from the compressing unit 24, outputs the multiplexed data obtained thereby, and ends the processing.

Figure 9:
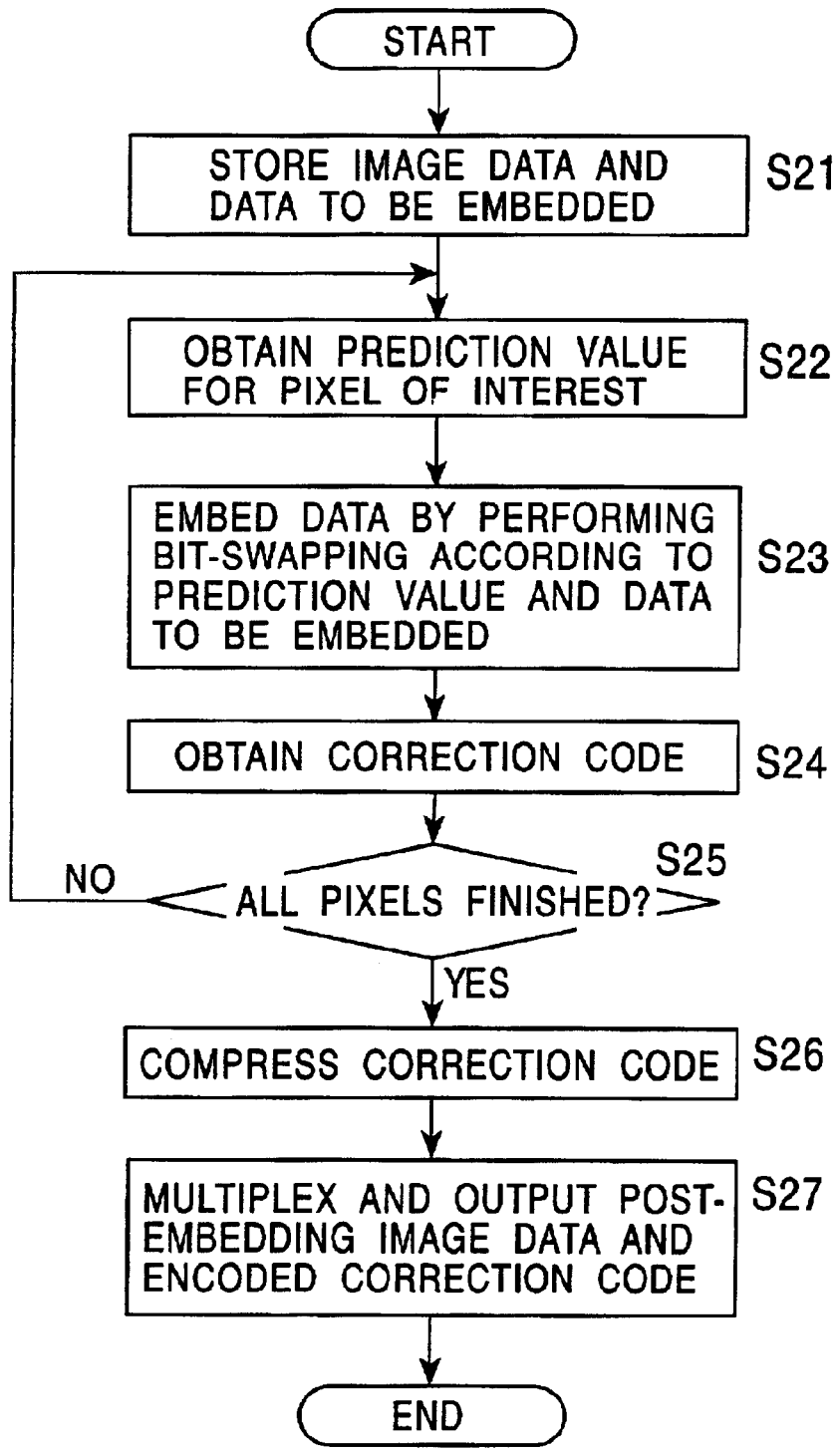
FIG. 9 is a flowchart describing the processing of the embedded coding apparatus shown in FIG. 8.

The processing in the flowchart shown in FIG. 9 is performed for each frame of image data supplied to the embedded coding apparatus.

Figure 10:
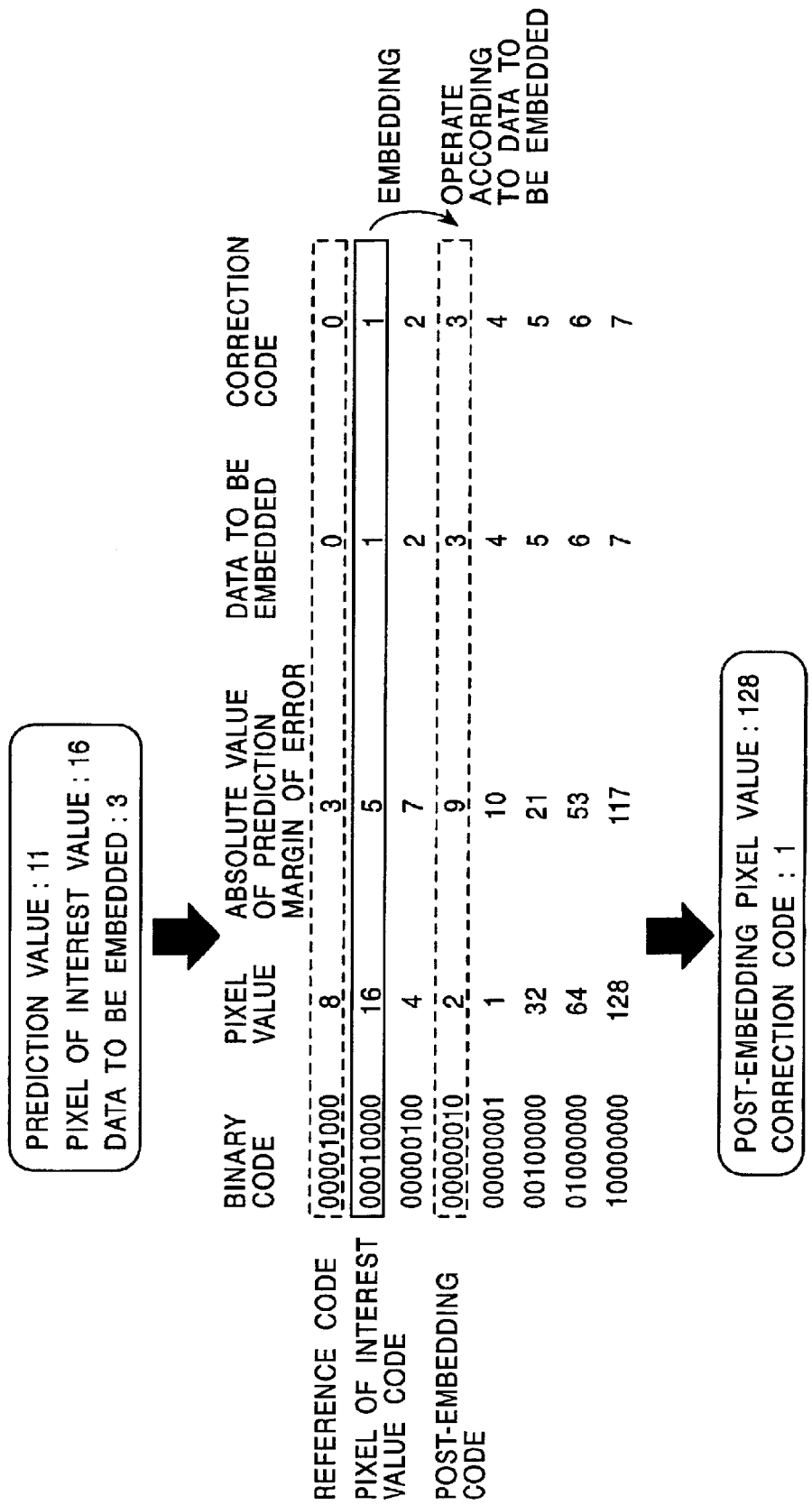
FIG. 10 is a diagram describing the process of the embedded coding apparatus shown in FIG. 8.

According to the embedded coding processing such as described above, data to be embedded is embedded in pixel values as shown in FIG. 10, for example.

That is, FIG. 10 illustrates a case wherein the pixel value of the pixel of interest is "16", and embedding data with a value of "3" is being embedded in the pixel of interest. Also, in FIG. 10, "11" is obtained as the prediction value of the pixel of interest, by the prediction value obtaining unit 21.

In this case, the bit-swap embedding unit 22 performs bit-swapping on a bit string making up the binary code "00010000" corresponding to the pixel value "16", thereby obtaining binary code as bit strings of all patterns from the bit string corresponding to the binary code. Accordingly, in this case, the eight patterns of binary code, "00000001", "00000010", "00000100", "00001000", "00010000", "00100000", "01000000", and "10000000", are obtained.

Further, the bit-swap embedding unit 22 obtains the prediction margin of error of the prediction value for the pixel of interest as to the pixel value represented by the binary code obtained as the result of bit-swapping. In this case, the eight patterns of binary code obtained are "00000001", "00000010", "00000100", "00001000", "00010000", "00100000", "01000000", and "10000000", which represent the pixel values "1", "2", "4", "8", "16", "32", "64", and "128", so the prediction margin of error (magnitude of prediction margin of error) for the prediction value "11" for each of these pixel values are, 10, 9, 7, 3, 5, 21, 53, and 117, respectively.

Once the prediction margin of error is obtained, the bit-swap embedding unit 22 outputs the binary code in the order corresponding to the value of the embedding data when the binary code obtained as the result of bit-swapping is listed in ascending order of prediction margin of error obtained regarding each binary code, as binary code corresponding to the post-embedding pixel value.

That is, in the event wherein the pixel value of the pixel of interest is "16" and the prediction value thereof is "11", the binary code obtained as the result of bit-swapping is listed in ascending order of prediction margin of error as shown in FIG. 10.

Further, in FIG. 10, embedding data #i is correlated to the binary code situated at position No, i+1, and accordingly, in the event that the data to be embedded is "3", the binary code "00000010" situated at position No. 4 (=3+1) is output as the binary code corresponding to the post-embedding pixel value. In this case, the post-embedding pixel value is "2", which corresponds to "00000010".

Also, though the present embodiment involves correlating the embedding data #i with the binary code situated at the No, i+1 position when the binary code obtained as the result of bit-swapping is listed in ascending order of prediction margin of error obtained regarding each binary code, there is no particular restriction regarding which order position binary code to correlate the data to be embedded to, or the value of the data to be embedded. However, there is the need for the embedded coding apparatus and the decoding apparatus to agree on which order position binary code to correlate the data to be embedded to, and the value of the data to be embedded.

Also, there are cases wherein the prediction margin of error for one binary code and another binary code are the same, and what sort of order is to be used in such cases should be determined beforehand. For example, an arrangement may be made wherein, of the two binary codes with the same prediction margin of error, the binary code with the smaller corresponding pixel value is positioned higher.

The bit-swap embedding unit 22 outputs, as correction code, information representing the order of the binary code representing the pixel value of the pixel of interest, of the binary codes listed in ascending order of prediction margin of error, following obtaining the post-embedding pixel value (though this may be output before or simultaneously with obtaining the post-embedding pixel value).

In FIG. 10, the correction code #i−1 is correlated with the binary code positioned at position No. i, and accordingly, in the event that the pixel value of the pixel of interest is "16", the binary code "00010000" corresponding to the "16" is situated in position No. 2, so "1" (=2−1) is output as the correction code.

Now, of the binary code arrayed in ascending order of prediction margin of error, with the binary code with the smallest prediction margin of error (i.e., the binary code in position No. 1) as a reference code, the correction code can be understood to be information representing the relative position of the binary code which the pixel value of the pixel of interest represents, as to reference code.

Also, though the present embodiment involves correlating the correction code #i−1 with the binary code situated at the No. i position when the binary code obtained as the result of bit-swapping is listed in ascending order of prediction margin of error obtained regarding binary code, there is no particular restriction regarding which order position binary code to correlate the correction code with, or the value of the correction code. However, there is the need for the embedded coding apparatus and the decoding apparatus to agree on which order position binary code to correlate the correction code to, and the value of the correction code, as with the correlation of the binary code and the embedding data.

Figure 11:
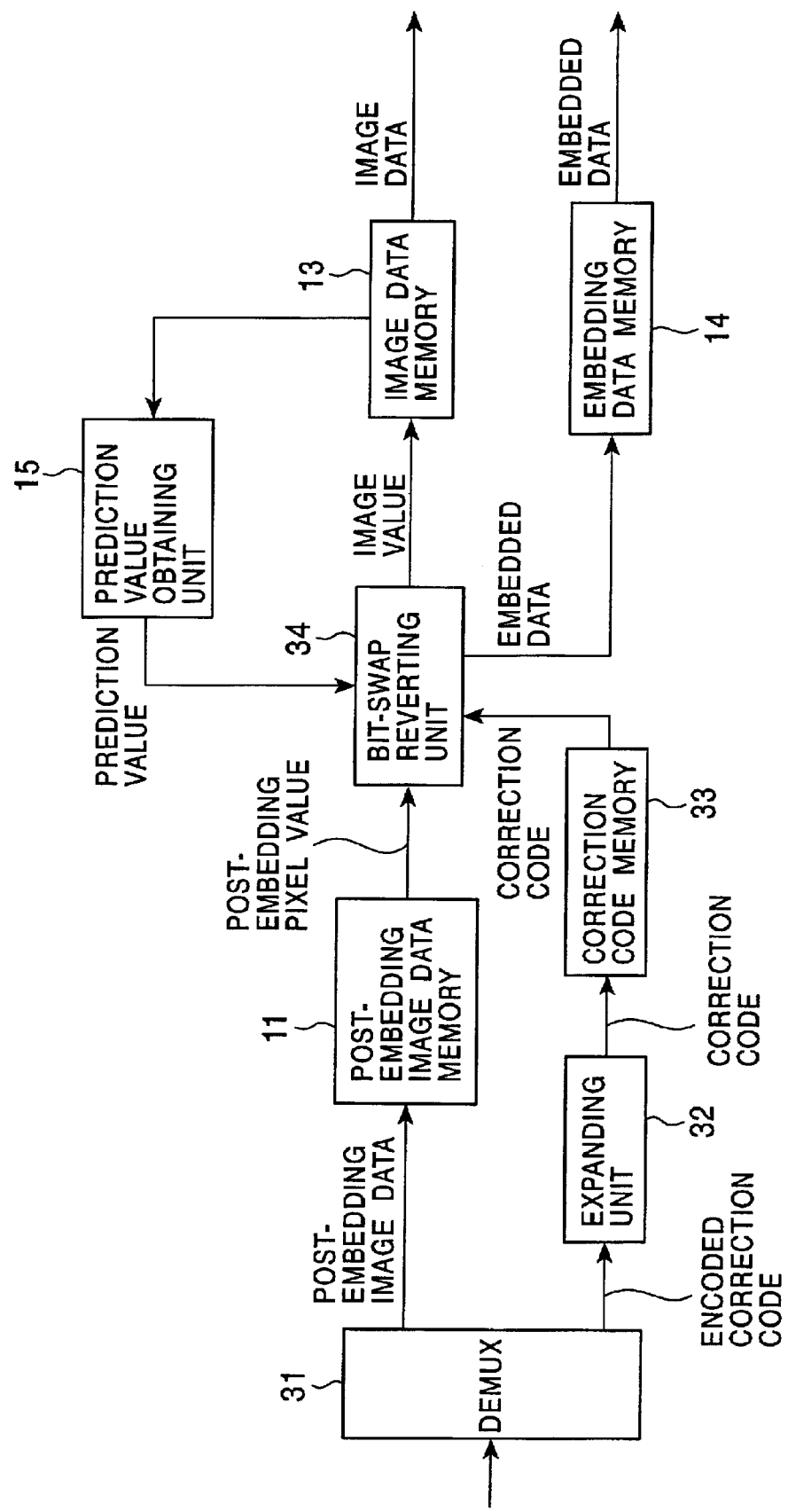
FIG. 11 is a block diagram illustrating an example of the configuration of an embodiment of a decoding apparatus using correction code.

Next, FIG. 11 illustrates an example of the configuration of an embodiment of a decoding apparatus for decoding the original pixel value and the embedded data, from the multiplexed data which the embedded coding apparatus shown in FIG. 8 outputs. Incidentally, with regard to parts corresponding to those in FIG. 5, these are denoted by the same reference numerals, and description thereof will be omitted where appropriate. That is, the decoding apparatus shown in FIG. 11 is the same as that shown in FIG. 5, other than a DEMUX (demultiplexer) 31, expanding unit 32, and correction code memory 33 are further provided, and that a bit-swap reverting unit 34 is provided instead of the bit-swap reverting unit 12.

The DEMUX 31 is arranged so as to be supplied with multiplexed data output by the embedded coding apparatus shown in FIG. 8, via a predetermined sending medium or recording medium. The DEMUX 31 splits the multiplexed data into post-embedded image data and coded correction code. The post-embedded image data is supplied to the post-embedded image data memory 11, and the coded correction code 32 is supplied to the expanding unit 32.

The expanding unit 32 subjects the coded correction code from the DEMUX 31 to entropy decoding, and supplies this to the correction code memory 33 as the correction code. The correction code memory 33 temporarily stores the correction code from the expanding unit 32.

Figure 5:
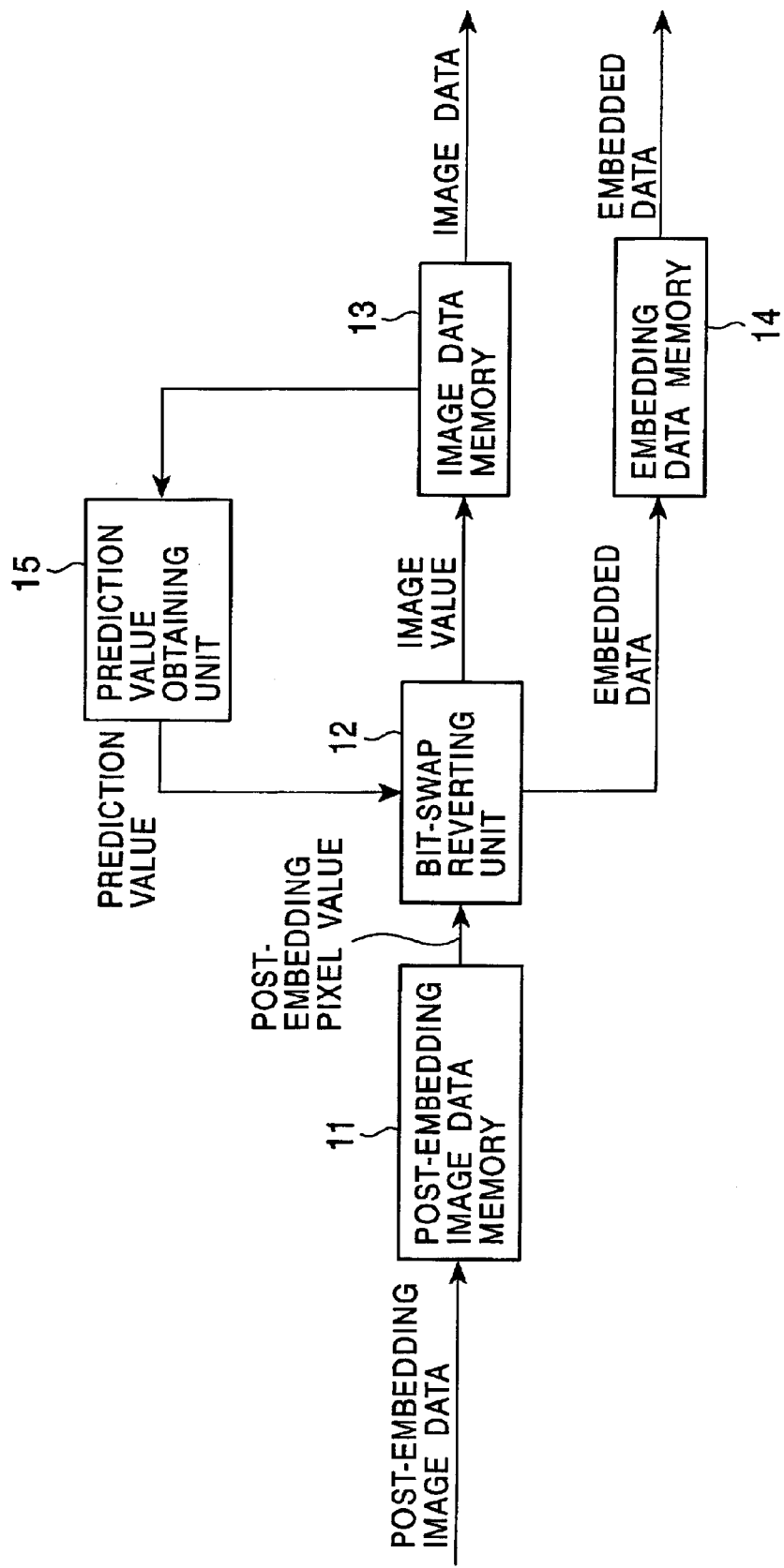
FIG. 5 is a block diagram illustrating the configuration of an example of a conventional decoding apparatus.

As with the bit-swap reverting unit 12 shown in FIG. 5, the bit-swap reverting unit 34 sequentially, e.g., in raster scan order, takes pixels making up the post-embedding image data stored in the post-embedding image data memory 11, as pixels of interest, reads out the post-embedding pixel value of the pixel of interest from the post-embedding image data memory 11, and also obtains a prediction value for the pixel value of the pixel of interest from the prediction value obtaining unit 15. Further, the bit-swap reverting unit 34 performs bit-swapping of the bits making of the bit string representing the post-embedding pixel value of the pixel of interest according to the prediction value of the pixel of interest, thereby decoding the embedding data embedded in the pixel of interest. The bit-swap reverting unit 34 also decodes the pixel value in the pixel of interest, based on the bit-swap results and the correction code regarding the pixel of interest stored in the correction code memory 33. The pixel value of the pixel of interest that has been decoded is supplied from the bit-swap reverting unit 34 to the image data memory 13, and the embedded data is supplied to the embedded data memory 14 from the bit-swap reverting unit 34.

Next, the processing of the decoding apparatus shown in FIG. 11 (decoding processing) will be described with reference to the flowchart shown in FIG. 12.

In the event that the decoding apparatus is provided with, for example, one frame (or field) of multiplexed data, the multiplexed data is split by the DEMUX 31 into post-embedding image data and coded correction data. Then, in step S31, the post-embedding image data supplied to the post-embedding image data memory 11, where it is stored. Further, in step S31, the coded correction code is subjected to entropy decoding at the expanding unit 32, and supplied to the correction code memory 33, where it is stored.

Subsequently, the bit-swap reverting unit 34 sequentially takes as pixel of interest, in raster scan order, of the pixels making up the post-embedding image data stored in the post-embedding image data memory 11, those not yet taken as pixel of interest, and in step S32 the prediction value obtaining unit 15 obtains the prediction value of the pixel of interest based on already-decoded pixel values stored in the image data memory 13, and supplies this to the bit-swap reverting unit 34. That is to say, the prediction value obtaining unit 15, as with the case of the prediction value obtaining unit 21 shown in FIG. 8, takes the pixel value of the pixel to the left of the pixel of interest as the prediction value of the pixel of interest, and supplies this to the bit-swap reverting unit 34.

The bit-swap reverting unit 34 reads the post-embedding pixel value of the pixel of interest from the post-embedding image data memory 11, and also reads the correction code regarding the pixel of interest from the correction code memory 33. Further, the bit-swap reverting unit 34 receives the prediction value of the pixel value of the pixel of interest from the prediction value obtaining unit 15, in step S33 performs bit-swapping of the bits making up the bit string representing the post-embedding pixel value of the pixel of interest according to the prediction value of the pixel of interest, decodes the pixel value of the pixel of interest and the embedded data embedded therein from the bit-swap results and correction code, and the flow proceeds to step S34.

In step S34, the bit-swap reverting unit 34 supplies the decoded value of the pixel value of the pixel of interest to the image data memory 13 where it is stored, and also supplies the decoded value of the embedded data to the embedded data memory 14, where it is stored.

Figure 6:
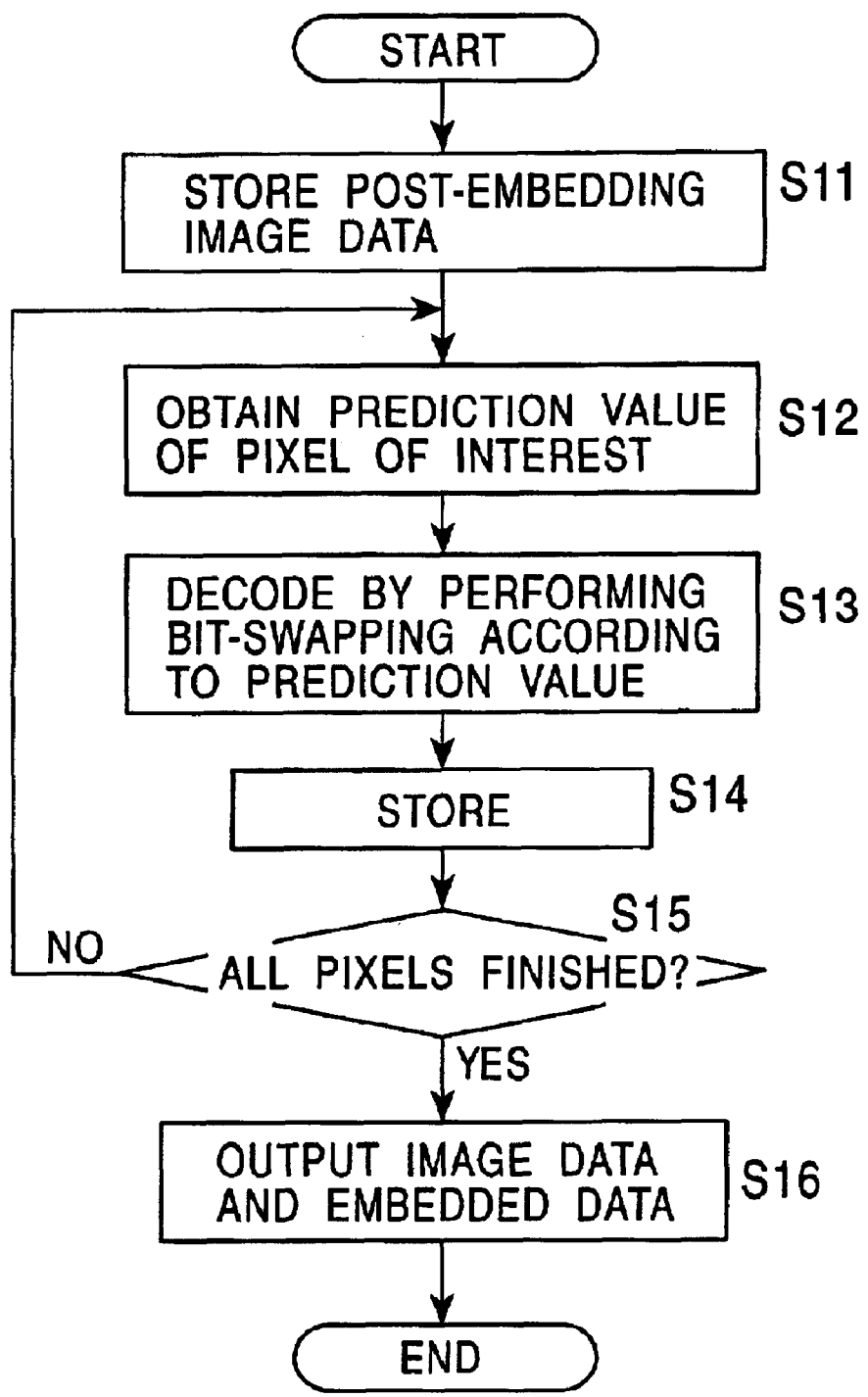
FIG. 6 is a flowchart describing the processing of the decoding apparatus shown in FIG. 5.
Figure 7:
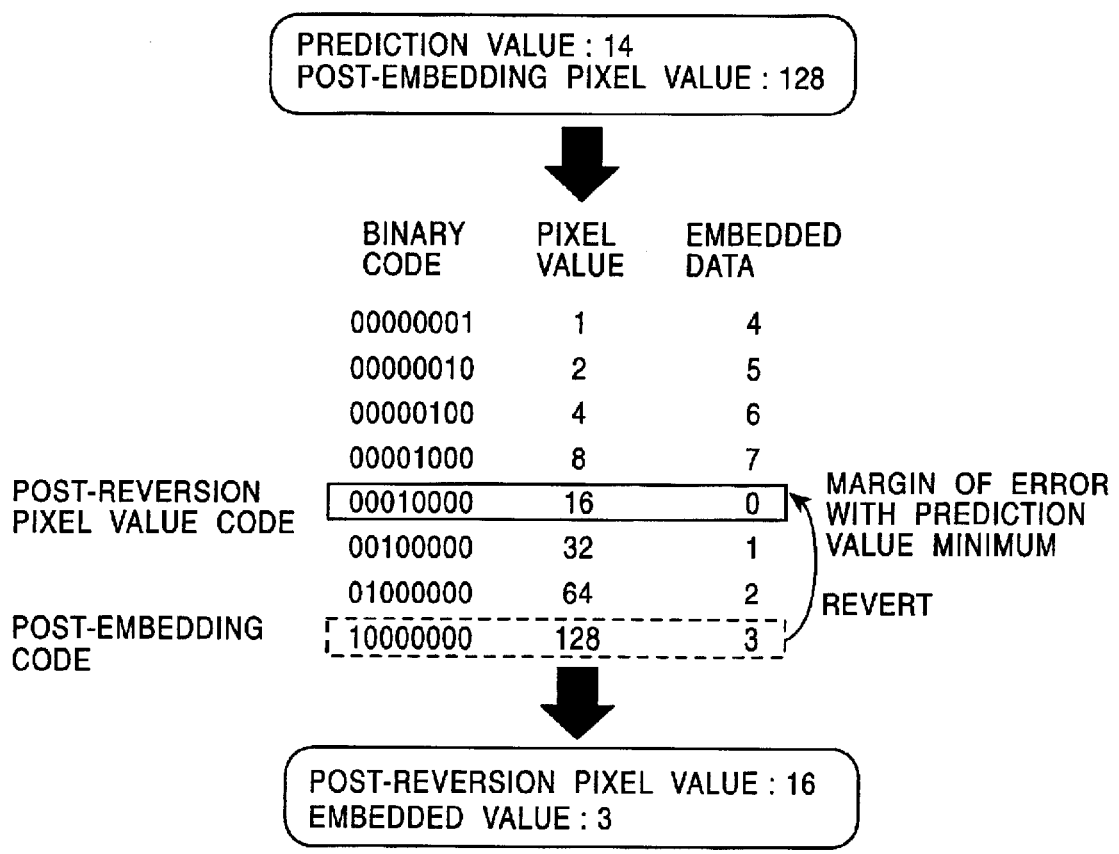
FIG. 7 is a diagram describing the process of the decoding apparatus shown in FIG. 5.

Subsequently, in steps S35 and S36, the processing the same as that in steps S15 and S16 in FIG. 6 are performed, thereby ending the processing.

Figure 12:
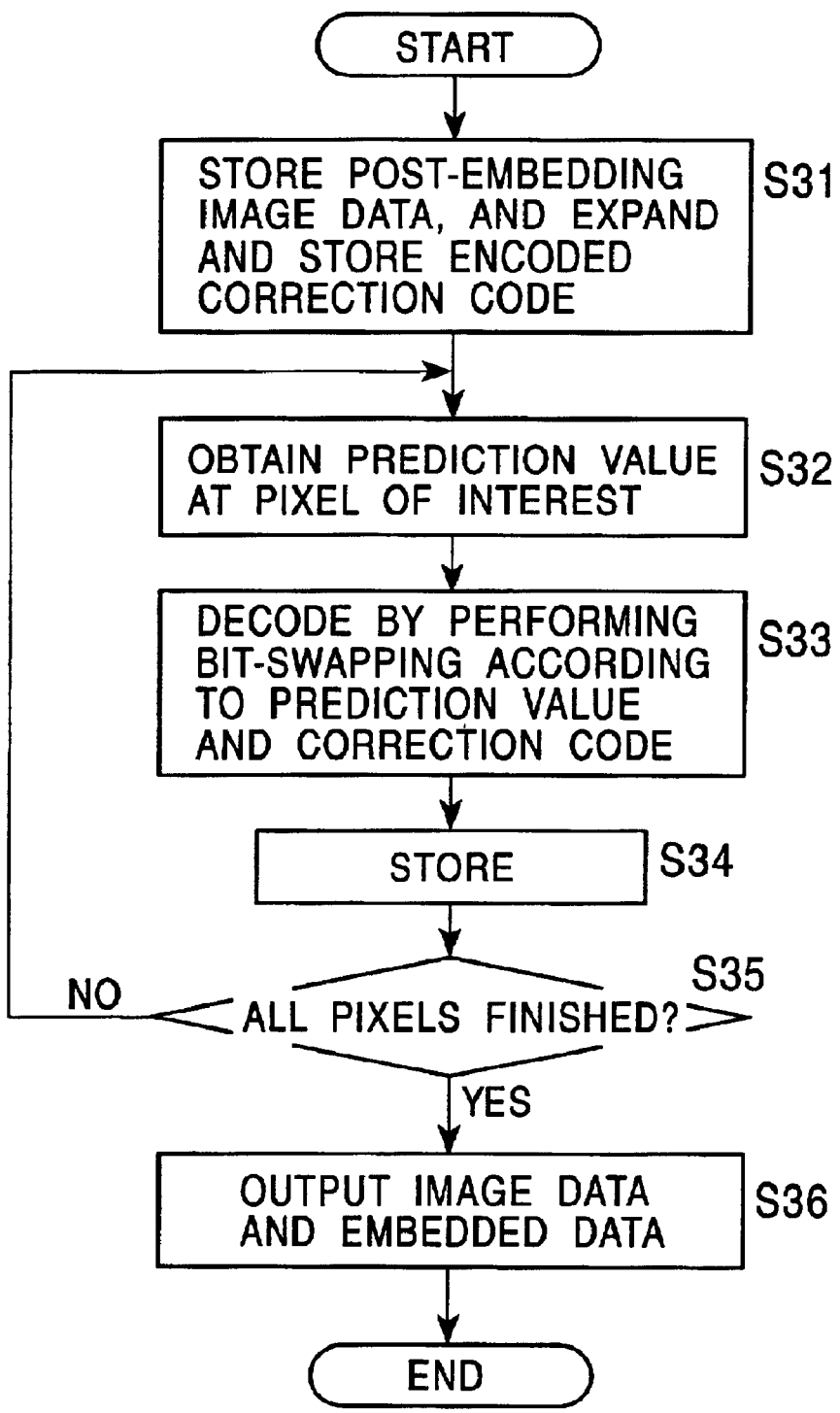
FIG. 12 is a flowchart describing the processing of the decoding apparatus shown in FIG. 11.

The processing of the flowchart shown in FIG. 12 is performed for one frame of multiplexed data each time one frame of multiplexed data is supplied to the decoding apparatus.

Figure 13:
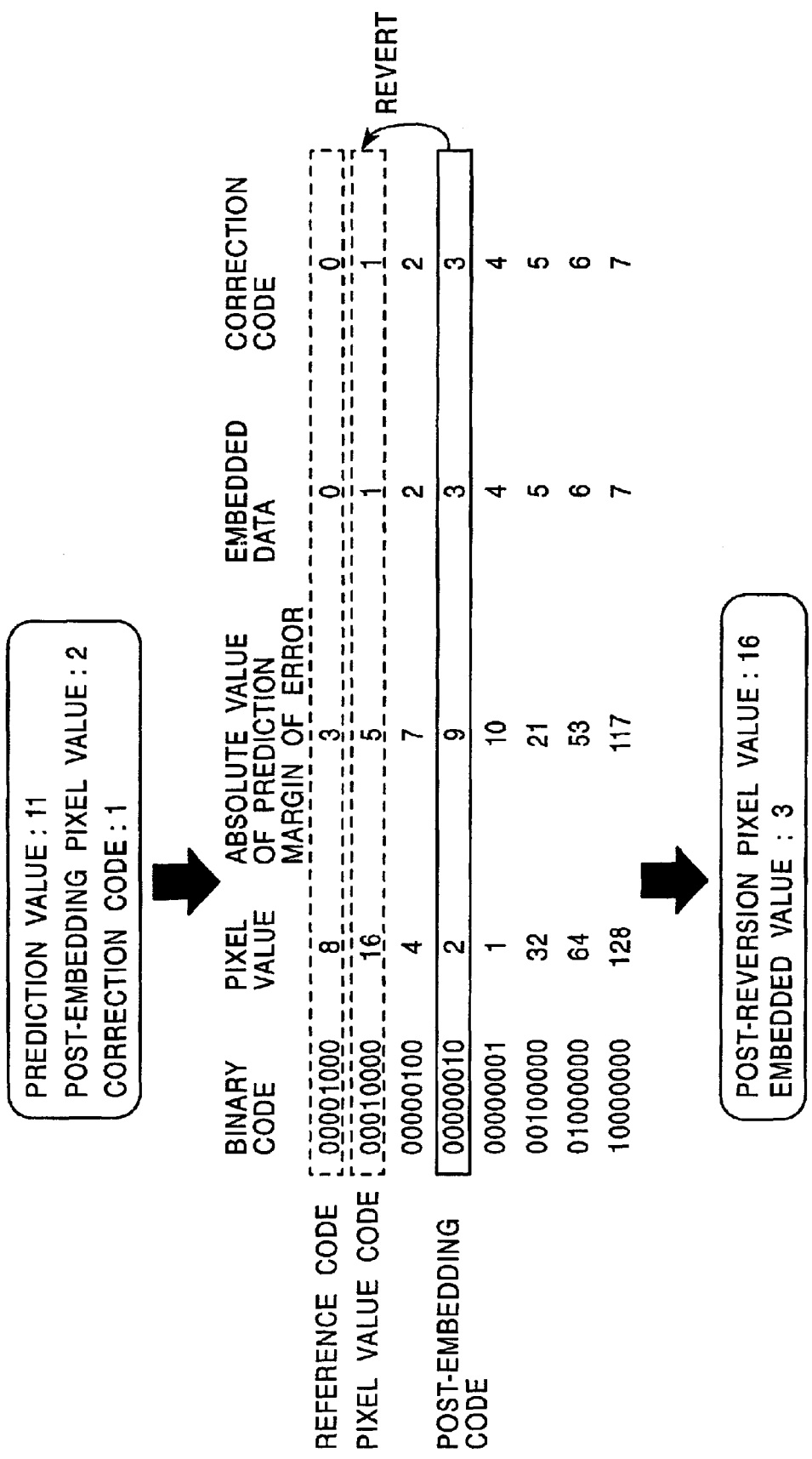
FIG. 13 is a diagram describing the process of the decoding apparatus shown in FIG. 11.

According to such decoding processing, the post-embedding pixel values are decoded into pixel values and embedded data, as shown in FIG. 13, for example.

That is, as described with reference to FIG. 10, FIG. 13 illustrates a case of decoding the post-embedding pixel value "2" obtained by embedding data to be embedded with a value of "3" into a pixel value of "16". Also, as described with FIG. 10, "1" is obtained as the correction code.

The binary code representing the post-embedding pixel value "2" is "00000010". This binary code is obtained by performing bit-swapping on the binary code representing the original pixel value, so the binary code representing the original pixel value exists with the all of the bit string patterns obtained by performing bit-swapping on the binary code "00000010" representing the post-embedding pixel value "2". Accordingly, finding the binary code representing the original pixel value from the all of the bit string patterns obtained by performing bit-swapping on the binary code "00000010" representing the post-embedding pixel value "2" decodes the original pixel value.

Also, with the embedded coding apparatus shown in FIG. 8, the original image value is subjected to embedded coding to a post-embedding pixel value of a value corresponding to binary code situated in an order corresponding to the value of the embedded data when binary code obtained as a result of bit-swapping binary code corresponding to the pixel value is listed in ascending order of prediction margin of error of the prediction value thereof, so once the order of the binary code representing the post-embedding pixel value when the binary code obtained as a result of bit-swapping binary code representing the post-embedding pixel value is listed in ascending order of prediction margin of error is found, the embedded data embedded in the post-embedding pixel value can be decoded.

Thus, in order to decode the pixel value, the bit-swap reverting unit 34 first performs bit-swapping of the binary code "10000000" representing the post-embedding pixel value "2", thereby obtaining bit strings of all patterns obtained from that binary code. Accordingly, in this case, the eight patterns of binary code, "00000001", "00000010", "00000100", "00001000", "00010000", "00100000", "01000000", and "10000000", are obtained.

Further, the bit-swap reverting unit 34 obtains the prediction margin of error of the prediction value for the pixel of interest as to the pixel value represented by the binary code obtained as the result of bit-swapping. In this case, the eight patterns of binary code obtained are "00000001", "00000010", "00000100", "00001000", "00010000", "00100000", "01000000", and "10000000", which represent the pixel values "1", "2", "4", "8", "16", "32", "64", and "128", so the prediction margin of error (the magnitude of the prediction margin of error) for the prediction value "11" for each of these pixel values are, 10, 9, 7, 3, 5, 21, 53, and 117, respectively.

Once the prediction margin of error is obtained, the bit-swap reverting unit 34 outputs the binary code in the order corresponding to the corresponding code when the binary code obtained as the result of bit-swapping is listed in ascending order of prediction margin of error obtained regarding each binary code, as binary code corresponding to the original pixel value.

That is, in the event wherein the post-embedding pixel value of the pixel of interest is "2" and the prediction value thereof is "11", the binary code obtained as the result of bit-swapping is listed in ascending order of prediction margin of error as shown in FIG. 13.

Further, in FIG. 13, as with the case in FIG. 10, correction code #i–1 is correlated to the binary code situated at position No. i, and accordingly, in the event that the correction code is "1", the value "16" represented by the binary code "00010000" situated at position No. 2 (=1+1) becomes the decoded results of the original pixel value.

Also, the bit-swap reverting unit 34 outputs, as the decoding results of embedded data, a value corresponding to the order of binary code corresponding to the post-embedding pixel value when the binary code obtained as the result of bit-swapping is listed in ascending order to prediction margin of error obtained relating to each binary code.

That is, in FIG. 13, as with the case in FIG. 10, embedded data #i is correlated to the binary code situated at position No. i+1, and accordingly, in the event that the post-embedding pixel value is "2", the corresponding binary code "00000010" is situated at position No. 4, so the decoding results of the embedded data is "3" (=4–1).

Thus, the post-embedding pixel value "2" is accurately decoded into the original pixel value "16" and the embedded data "13" embedded therein.

As described above, in the case of using correction code, the pixel value and embedded data can be always accurately decoded, i.e., completely-reversible embedded coding and decoding can be performed.

Now, completely-reversible processing can be realized in the case of using correction code, but the amount of data of the embedded coding results increases by the amount of data of the coded correction code, as compared to cases not using the correction code. Accordingly, the data amount of coded correction code should be kept as small as possible, from the perspective of compression percentages.

Further, in the event of subjecting the correction code to entropy encoding or the like, to make an coded correction code, the correction code must be converted on a particular value, in order to reduce the amount of data of the coded correction code.

However, as described above, the intervals between pixel values corresponding to conventional binary code (hereafter also referred to as "conventional code") appropriated to pixel values are fine at places and coarse at others, so there are irregularities in the correction code according to change of value obtained as a prediction value (i.e., precision of prediction value), with regard to pixel values where the intervals are fine, in particular.

FIG. 14A illustrates, of the 8-bit conventional code, pixel values corresponding with all eight patterns of bit-swap results for conventional 8-bit code with only one bit of "1".

For example, let us say that the pixel value of the pixel of interest is a value "16" which corresponds to the conventional code "00010000", and a value "17" is obtained as the prediction value of the pixel of interest, taking the eight patterns of conventional code as the bit-swapping results of the conventional code "00010000" and listing these in ascending order of prediction margin of error of the prediction value "17" as to pixel values corresponding to each conventional code, the result is as shown in FIG. 14B. In this case, the prediction margin of error of the prediction value "17" as to the pixel value "16" of the pixel of interest is "1" (=|17−16|) and this is the smallest, so the order of the conventional code "00010000" corresponding to the pixel value "16" of the pixel of interest is No. 1, and accordingly the correction code is "0".

On the other hand, in the event that the value "8", for example, is obtained as the prediction value of the pixel of interest, listing the eight patterns of conventional code as bit-swap results of the conventional code "00010000" in ascending order of the prediction margin of error of the prediction value "8" as to pixel values corresponding to each of the conventional code, the result is as shown in FIG. 14C. In this case, the prediction margin of error of the prediction value "8" as to the pixel value "16" of the pixel of interest is "8" (=|8−16|) and thus is the fifth smallest, so the order of the conventional code "00010000" corresponding to the pixel value "16" of the pixel of interest is No. 5, and accordingly the correction code is "4".

In this way, the reason that the order of the conventional code "00010000" representing the pixel value "16" of the pixel of interest changes widely from No. 1 to No. 4 depending on the prediction value is that the intervals between the pixel values "1", "2", "4", and "8" below the pixel value "16" of the pixel of interest are fine. That is, in the event that the intervals of pixel values corresponding to the bit-swapping results obtained by bit-Swapping the conventional code corresponding to the pixel value of the pixel of interest are fine, the order of the conventional code which makes small the prediction margin of error as to the pixel value which the conventional code as the bit-swapping results greatly changes even though the prediction value changes only slightly. The correction code corresponds to this order so in the event that the order changes greatly, the correction code also changes greatly.

Accordingly, in order to reduce the change in correction code and to converge on a particular value, there is the need to appropriate as coarse a pixel value as possible (i.e., with wide intervals) to a bit string obtained by performing bit-swapping on a bit string corresponding to the pixel value of the pixel of interest, i.e., to a bit string obtained by performing bit-swapping on a bit string with the same number of 0s or 1s.

On the other hand, the number of values which can be assumed as a pixel value is a finite value determined by the number of bits appropriated to the pixel, so in the event that pixel values with very wide intervals are appropriated to a bit string obtained by performing bit-swapping on a bit string with a particular value for the number of 0s or 1s, the intervals of the pixel values which can be appropriated to a bit string obtained by performing bit-swapping on a bit string with another value for the number of 0s or 1s become fine (narrow).

Accordingly, appropriating pixel values to bit strings with the same number of 0s or 1s so that the intervals between the values corresponding to each of the bit strings are uniform and as coarse as possible enables the change in the correction code to be suppressed.

Now, let us appropriate pixel values to an 8-bit bit string such as shown in FIGS. 15 and 16, for example.

Note that in FIGS. 15 and 16, the "code" column represents 8-bit bit strings, the "old" column represents the pixel values corresponding to the conventional code in the event that the bit strings in the code column are viewed as conventional code. Also, the "new" column represents the pixel values corresponding to the new code in the event that the bit string in the "code" column is viewed as a new code to be appropriated to the pixel values (hereafter also referred to as "new code").

As described above, with the new code, pixel values are appropriated to new code with the same number of 0s or 1s so that the intervals between the pixel values corresponding to each new code are uniform and as coarse as possible, and consequently, irregularities in correction code due to the change in values obtained as prediction values (i.e., precision of prediction values) can be reduced.

FIG. 17 shows all 28 patterns of the bit-swapping results of the 8-bit new code with 6 bits of "1", and the corresponding pixel values.

For example, let us say that the pixel value of the pixel of interest is the same "16" as described with reference to FIG. 14. The new code corresponding to the pixel value "16" (i.e., the bit strings in the "code" column wherein the "new" column is "16" in FIGS. 15 and 16) is "01011111", and there are 28 patterns for this new code of the bit string obtained by bit-swapping the new code, as shown in FIG. 17. Note that in FIG. 17, the new code is shown with the pixel values corresponding to the new code (or appropriated thereto).

In this case, as with the case in FIG. 14B, saying that the value "17" is obtained as the prediction value of the pixel of interest, listing the new code for the 28 patterns as the bit-swap results of the new code "01011111" in ascending order of prediction margin of error of the prediction value "17" as to the pixel values corresponding to each new code, results in that shown in FIG. 18.

Now, regarding the new code with the same prediction margin of error, those with smaller appropriated pixel values are given higher orders.

In FIG. 18, the prediction margin of error of the prediction value "17" as to the pixel value "16" of the pixel of interest is "1" (=|17-16|), which is the smallest. That is, the order of the new code "01011111" corresponding to the pixel value "16" of the pixel of interest is No. 1, so the correction code is "0".

On the other hand, as with the case in FIG. 14C, saying that the value "8" is obtained as the prediction value of the pixel of interest, listing the new code for the 28 patterns as the bit-swap results of the new code "01011111" in ascending order of prediction margin of error of the prediction value "8" as to the pixel values corresponding to each new code, results in that shown in FIG. 19. In this case, the prediction margin of error of the prediction value "8" as to the pixel value "16" of the pixel of interest is "8" (=|8−16|), which is the second smallest. That is, the order of the new code "01011111" corresponding to the pixel value "16" of the pixel of interest is No. 2, so the correction code is "1".

As described above, with the new code, pixel values are appropriated to new code with the same number of 0s or 1s so that the intervals between the pixel values corresponding to each new code are uniform and as coarse as possible, so even in the event the values obtained as prediction values change, the change in order of the new code for making the prediction margin of error small can be suppressed, and accordingly, the change in the correction code can be also suppressed to a low level. Thus, employing the new code causes the correction code to converge near a certain value, i.e., as described above, near 0 in the event that correction code of integer values from 0 are being appropriated, according to the order of the new code making the prediction margin of error small.

In the event of performing entropy encoding of correction code converging around 0, the compression percentage can be improved over cases wherein entropy encoding is performed on correction code with greatly varying values.

Figure 20:
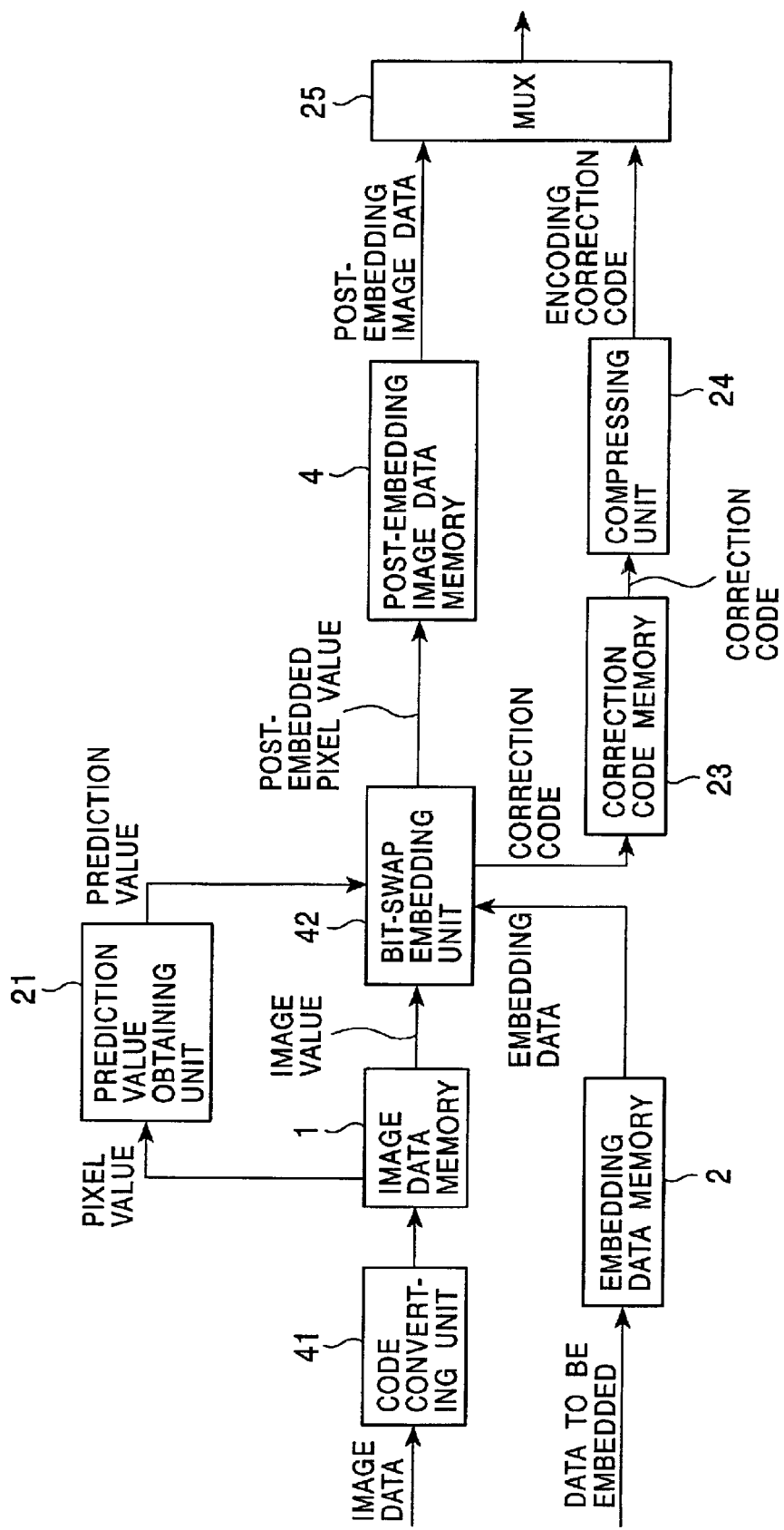
FIG. 20 is a block diagram illustrating an example of the configuration of an embodiment of an embedded coding apparatus to which the present invention is applied.

Accordingly, FIG. 20 shows a configuration example of an embodiment of an embedded coding apparatus for performing embedded coding using such a new code. Incidentally, in the figure, with regard to parts corresponding to those in FIG. 8, these are denoted by the same reference numerals, and description thereof will be omitted where appropriate. That is, the embedded coding apparatus shown in FIG. 20 is the same as that shown in FIG. 8, other than a code converting unit 41 being further provided, and a bit-swap embedding unit 42 being provided instead of the bit-swap embedding unit 22.

The code converting unit 41 receives supply of image data input to the embedded coding apparatus, and the code converting unit 41 converts the bit strings representing pixel values making up the image data from the conventional code to a new code, and supplies this to the image data memory 1.

The bit-swap embedding unit 42 performs the same processing as the bit-swap embedding unit 22 shown in FIG. 8, on the pixel values represented by the new code, thereby obtaining the post-embedding pixel values and correction code.

Figure 21:
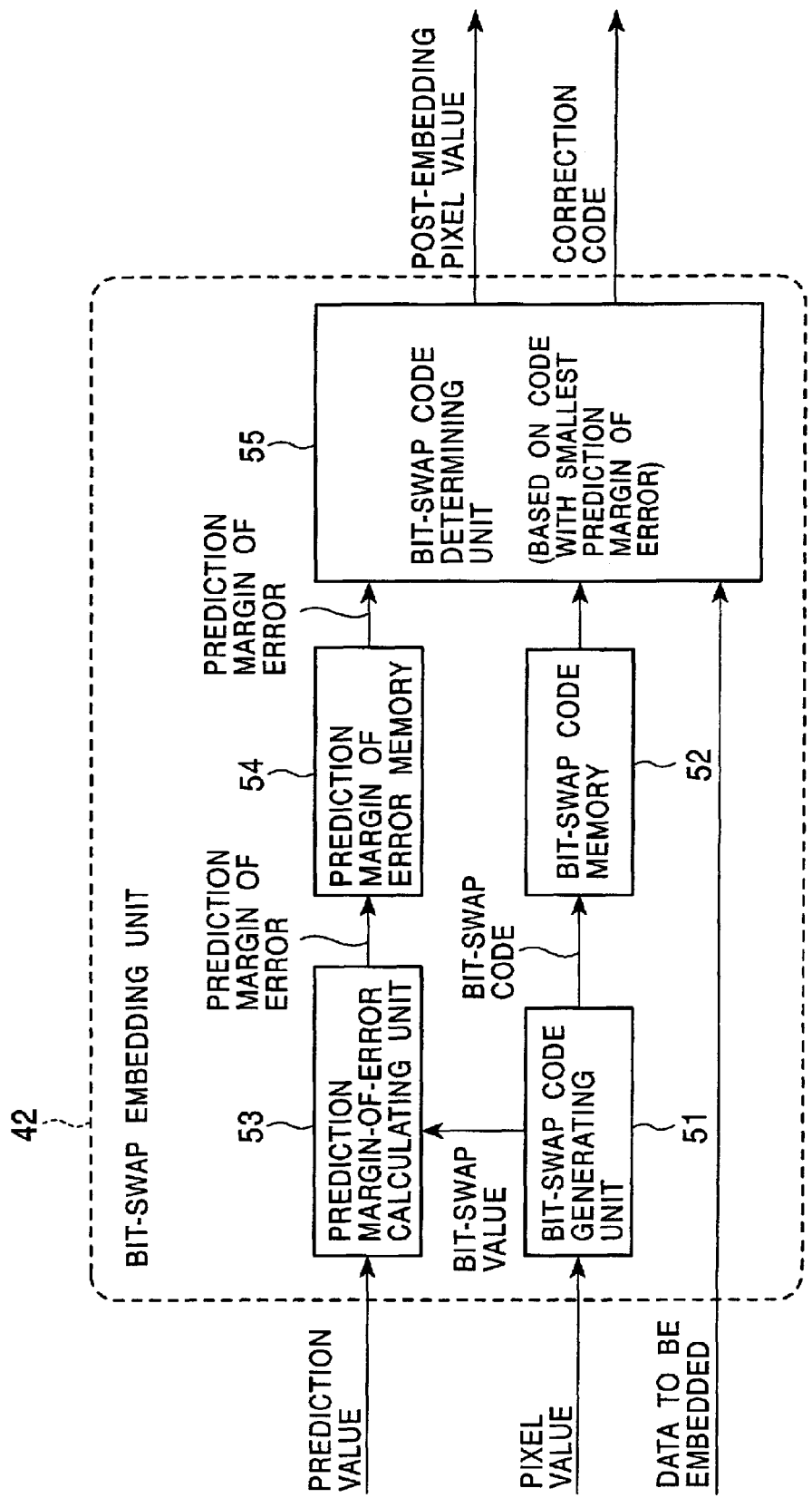
FIG. 21 is a block diagram illustrating a configuration example of a bit-swap embedding unit 42.

FIG. 21 illustrates a configuration example of the bit-swap embedding unit 42 shown in FIG. 20.

The prediction value of the pixel of interest output from the prediction value obtaining unit 21 shown in FIG. 20 is supplied to the prediction margin of error calculating unit 53, the pixel value of the pixel of interest output by the image data memory 1 is supplied to the bit-swap code generating unit 51, and the embedding data output by the embedding data memory 2 is supplied to the bit-swap code determining unit 55.

The bit-swap code generating unit 51 performs bit-swapping of the new code representing the pixel value of the pixel of interest supplied thereto, thereby obtaining the bit-swap results of all patterns, and the pixel values represented by each of the bit-swap results (hereafter also referred to as "bit-swap value") is supplied to the prediction margin of error calculating unit 53. Further, the bit-swap code generating unit 51 supplies the new code of all patterns obtained as the result of bit-swapping, to the bit-swap memory 52.

The bit-swap memory 52 temporarily stores the new code as the result of bit-swapping, supplied from the bit-swap code generating unit 51. The prediction margin of error calculating unit 53 calculates the prediction margin of error of the prediction value of the pixel of interest as to the bit-swap value from the bit-swap code generating unit 51, and supplies this to the prediction margin of error memory 54. The prediction margin of error memory 54 temporarily stores the prediction margin of error regarding the new code corresponding to each of the bit-swap results, supplied from the prediction margin of error calculating unit 53.

The bit-swap code determining unit 55 reads out the prediction margin of error stored in the prediction margin of error memory 54, and sorts in ascending order. Further, the bit-swap code determining unit 55 detects, in the prediction margin of error sorting results, the order of the new code representing the pixel value of the pixel of interest, and outputs a value corresponding to that order, as correction code.

Also, the bit-swap code determining unit 55 detects, in the prediction margin of error sorting results, the order corresponding to the value of the embedding data, obtains the pixel value represented by the new code of that order by making reference to the bit-swap code memory 72, and outputs this as a post-embedding pixel value.

Next, the processing of the embedded coding apparatus shown in FIG. 20 (embedded coding processing) will be described with reference to the flowchart shown in FIG. 22.

In the event that the embedding coding apparatus is provided with, for example, one frame (or field) of image data and embedding data to be embedded in that one frame of image data, in step S41 the code converting unit 41 converts the bit strings representing pixel values making up the image data from the conventional code to the new code, and supplies the pixel values represented in the new code to the image data memory 1.

In step S42, the image data memory 1 stores the image data made up of the pixel values supplied from the code converting unit 41. Further, in step S42, the embedding data memory 2 stores the data to be embedded.

Then, of the pixels making up the image data stored in the image data memory 1, pixels that have not yet been made a pixel of interest are taken by the bit-swap embedding unit 42 as pixel of interest in raster scan order, and in step S43, the prediction value obtaining unit 21 obtains the prediction value of the pixel of interest, and supplies this to the bit-swap embedding unit 42. That is to say, the prediction value obtaining unit 21 reads out the pixel value to the left of the pixel of interest from the image data memory 1 for example, and supplies this pixel value to the bit-swap embedding unit 42 as the prediction value of the pixel of interest.

Once the bit-swap embedding unit 42 receives the prediction value of the pixel of interest from the prediction value obtaining unit 21, in step S44 the pixel value of the pixel of interest is read out from the image data memory 1, and also the data to be embedded for the number of bits capable of being embedded in that pixel value is read out from the embedding data memory 2. Further, the bit-swap embedding unit 42 performs bit-swapping of the new code representing the pixel value of the pixel of interest, according to the prediction value of the pixel of interest and the data to be embedded, thereby performing bit-swap embedding processing for obtaining the post-embedding pixel value wherein embedding data is embedded in the pixel value of the pixel of interest, and the correction code.

Figure 23:
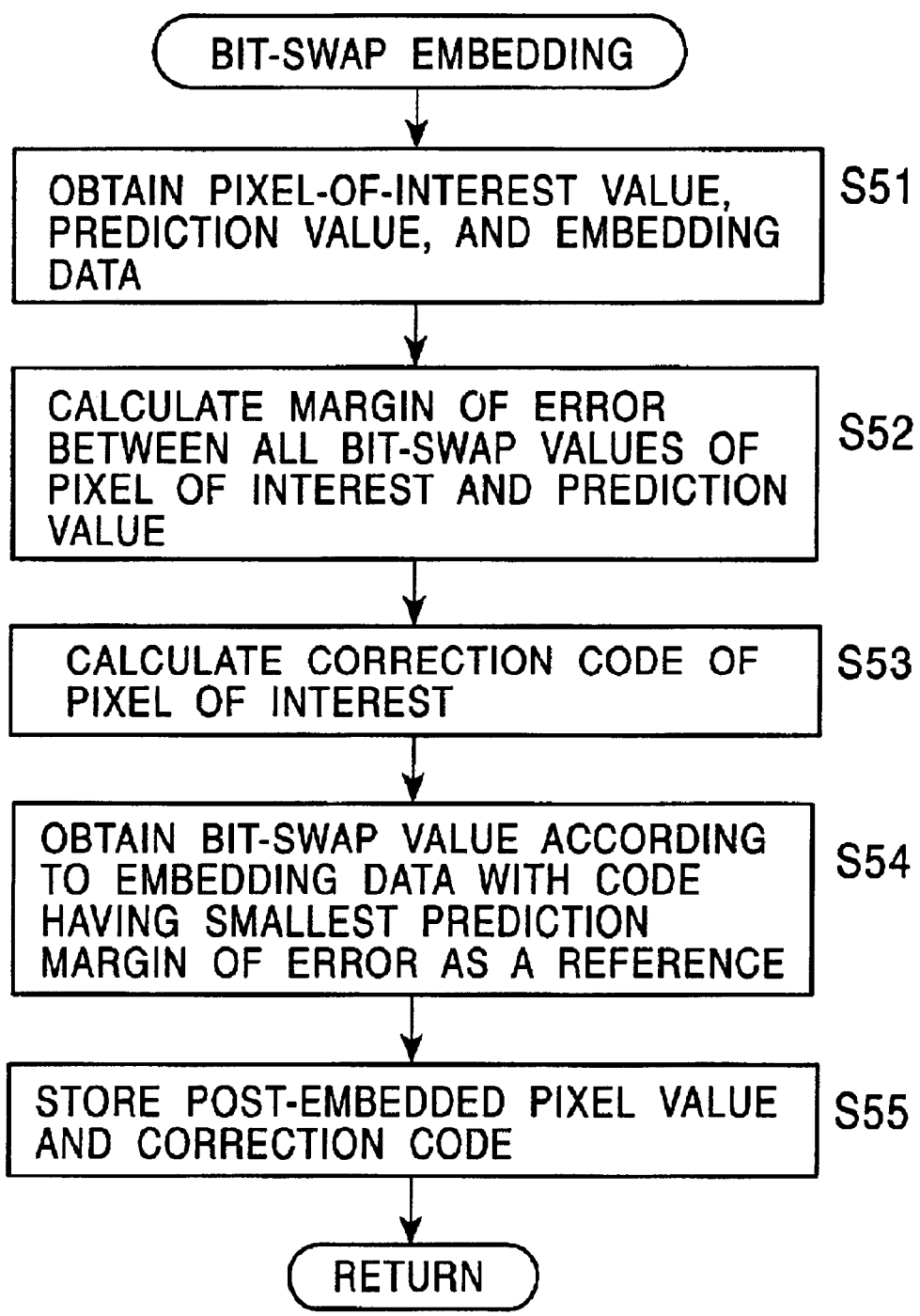
FIG. 23 is a flowchart describing in detail the processing in step S44 shown in FIG. 22.

That is to say, as shown in the flowchart in FIG. 23 for example, in step S44, the bit-swap embedding unit 42 (FIG. 21) obtains the pixel value of the pixel of interest, the prediction value thereof, and embedding data to be embedded in the pixel of interest, in step S51. Then, the pixel value of the pixel of interest is supplied to the bit-swap code generating unit 51, the prediction value of the pixel of interest is supplied to the prediction margin of error calculating unit 53, and the embedding data is supplied to the bit-swap code determining unit 55.

Subsequently, the flow proceeds to step S52, the bit-swap code generating unit 51 obtains the bit-swap results for all patterns by performing bit-swapping of the new code representing the pixel value of the pixel of interest, and stores this in the bit-swap memory 52. Also, in step S52, the bit-swap code generating unit 51 supplies the bit-swap value which is a pixel value represented by the bit-swap results, to the prediction margin of error calculating unit 53. Further, in step S52, the prediction margin of error calculating unit 53 calculates the prediction margin of error of the prediction value of the pixel of interest as to the bit-swap value from the bit-swap code generating unit 51, and supplies this to the prediction margin of error memory 54, where it is stored.

Then, the flow proceeds to step S53, the bit-swap code determining unit 55 reads out the prediction margin of error stored in the prediction margin of error memory 54, and sorts this in ascending order. Further, the bit-swap code determining unit 55 detects the position of the new code representing the pixel value of the pixel of interest in the prediction margin of error sorting results, and obtains a value corresponding to that order as the correction code.

Subsequently, in step S54 the bit-swap code determining unit 55 detects, in the prediction margin of error sorting results, the order corresponding to the value of the embedding data (the order represented by the embedding data, with the order of the bit-swapping results with the smallest prediction margin of error as a reference), and reads out the new code for that order from the bit-swap code memory 72. Further, the bit-swap code determining unit 55 obtains the pixel value represented by the new code as a post-embedding pixel value.

Upon the bit-swap code determining unit 55 thus obtaining the post-embedding pixel value and correction code, in step S55 stores the post-embedding pixel value and correction code in the post-embedding image data memory 4 shown in FIG. 20 and the correction code memory 23, respectively, and returns.

Returning to FIG. 22, following the processing in step s44, the flow proceeds to step s45, processing the same as that performed in steps S25 through S27 in FIG. 9 is performed in steps S45 through S47, and the processing ends.

Accordingly, in step S46, the correction code is subjected to entropy coding at the compressing unit 24, and made into coded correction code, wherein, in the event that new code is employed, the correction code converges around 0, so as described above, the compression percentage thereof is high.

Figure 22:
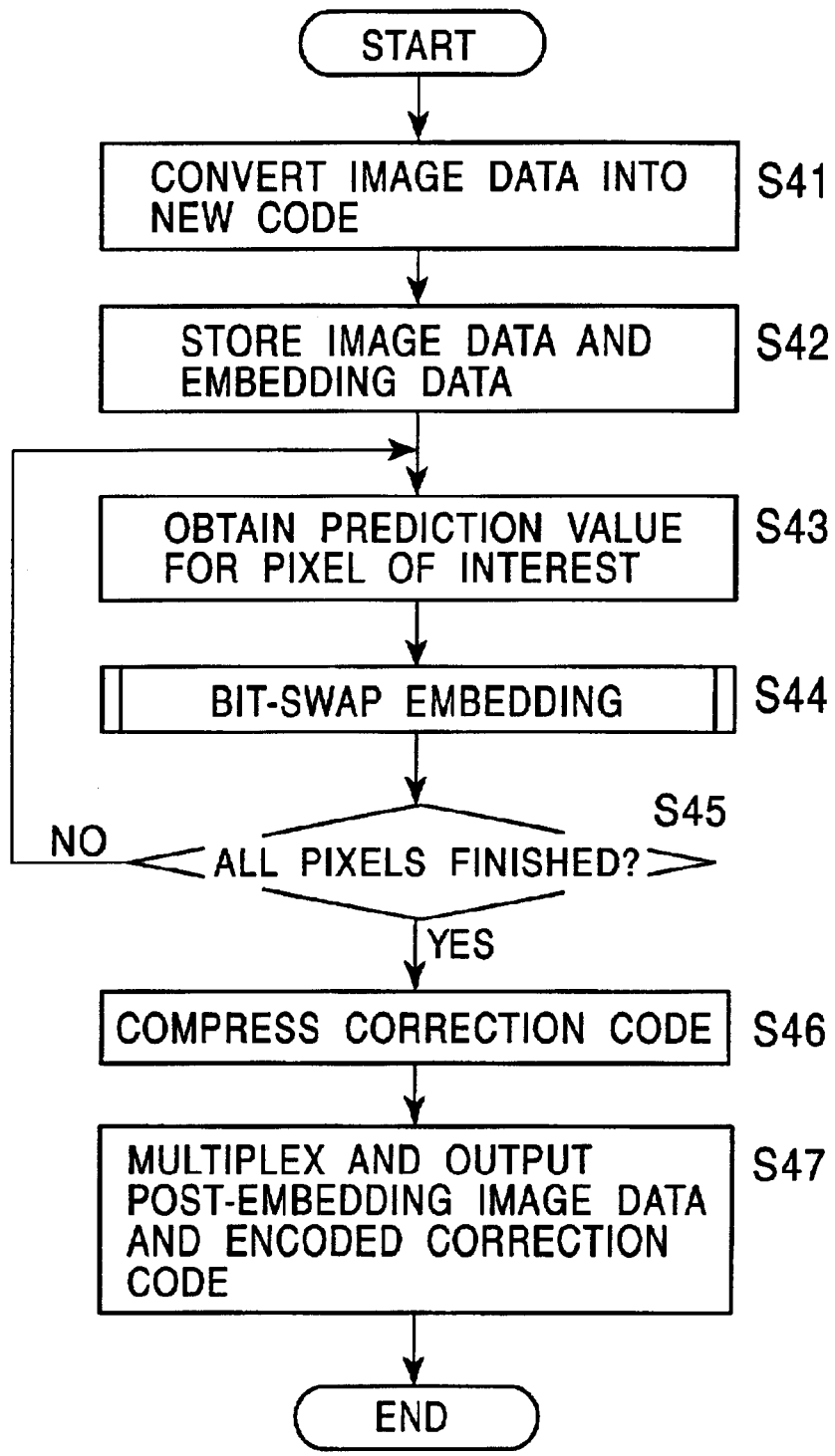
FIG. 22 is a flowchart describing the processing of the embedded coding unit shown in FIG. 20.

Also, the processing in the flowchart shown in FIG. 22 is performed for each frame of image data supplied to the embedded coding apparatus.

Figure 24:
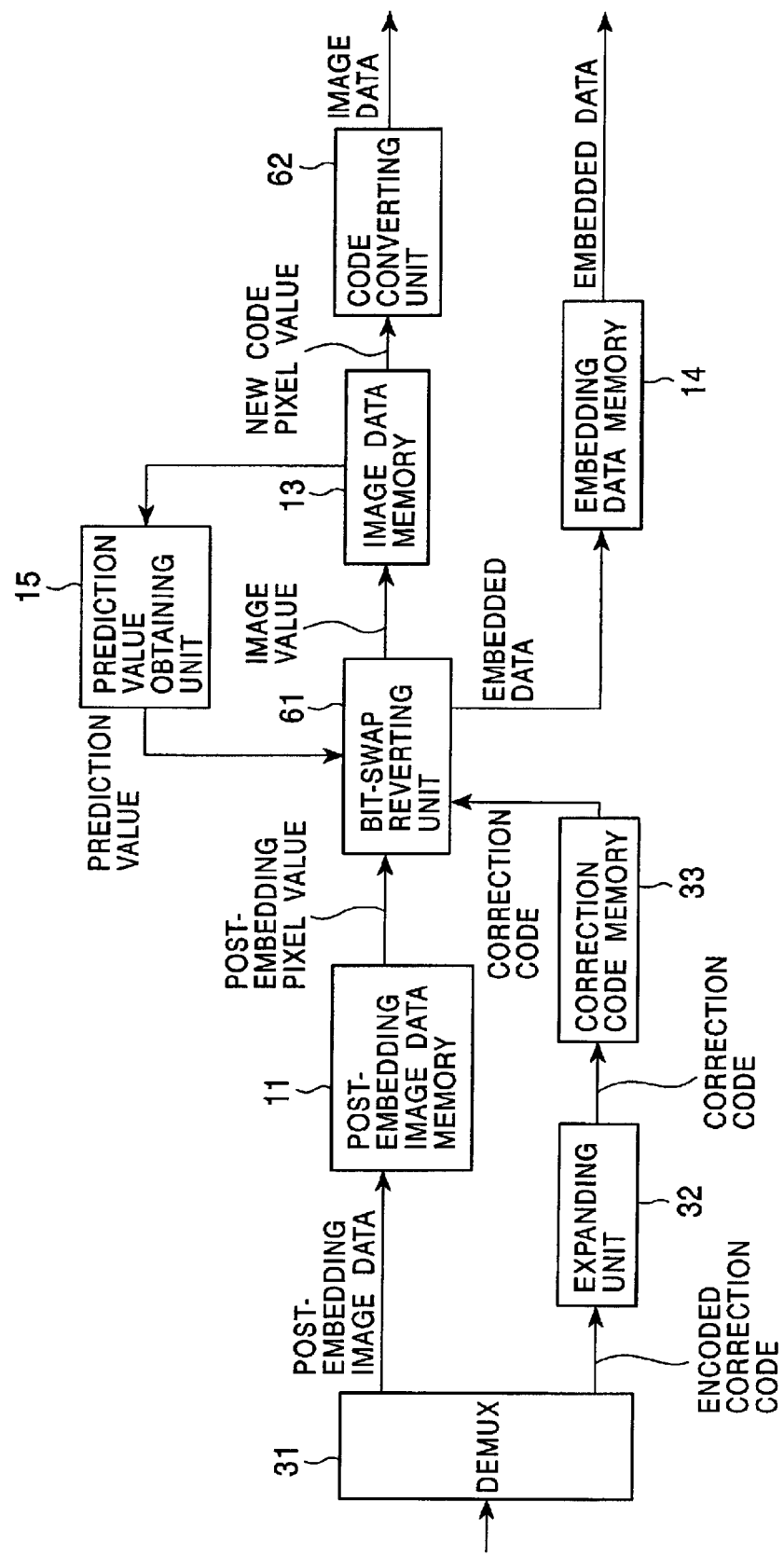
FIG. 24 is a block diagram illustrating an example of the configuration of an embodiment of a decoding apparatus to which the present invention is applied.

Next, FIG. 24 illustrates an example of the configuration of an embodiment of a decoding apparatus for decoding the original pixel value and embedded data from multiplied data output by the embedded coding apparatus shown in FIG. 20. Incidentally, with regard to parts corresponding to those in FIG. 11, these are denoted by the same reference numerals, and description thereof will be omitted where appropriate. That is, the decoding apparatus shown in FIG. 24 is the same as that shown in FIG. 11, other than a bit-swap reverting unit 61 being provided instead of the bit-swap reverting unit 34, and a code converting unit 62 being further provided.

The bit-swap reverting unit 61 decodes the embedded data that is embedded in the post-embedding pixel value, based on the post-embedding pixel value of the pixel of interest and the prediction value thereof, and further decodes the post-embedding pixel value to the pixel value to which the new code has been appropriated, based on the correction code as well.

The code converting unit 62 reads out the decoded pixel value from the image data memory 13 and converts the bit string representing the pixel value from the new code to the conventional code, and output this.

Figure 25:
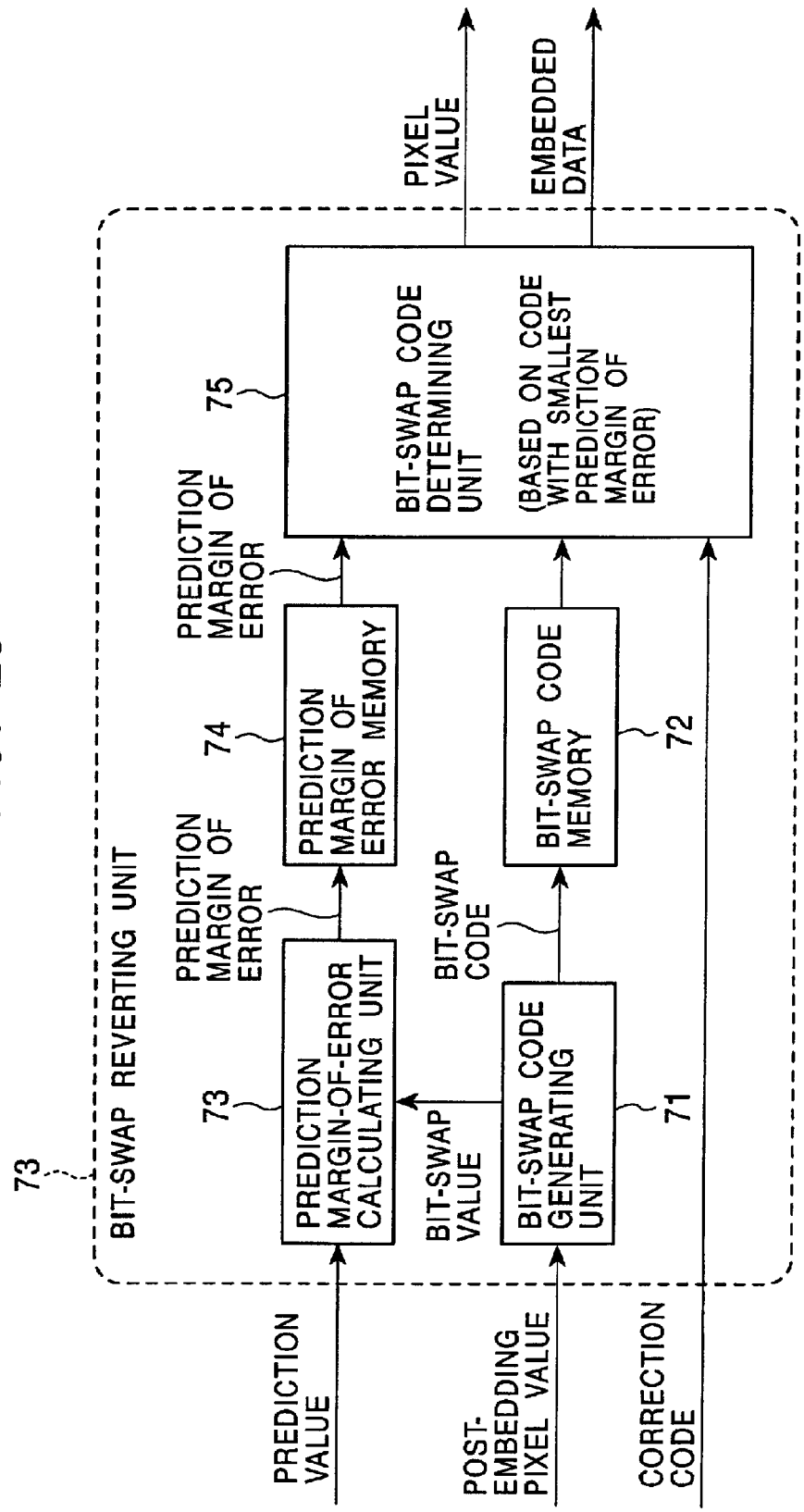
FIG. 25 is a block diagram illustrating a configuration example of a bit-swap reverting unit 61.

Next, FIG. 25 illustrates a configuration example of the bit-swap reverting unit 61 shown in FIG. 24.

The pixel value of the pixel of interest output by the prediction value obtaining unit 15 shown in FIG. 24 is supplied to the prediction margin of error calculating unit 73, the post-embedding pixel value of the pixel of interest output by the post-embedding image data memory 11 is supplied to the bit-swap code generating unit 71, and the correction code regarding the pixel of interest output by the correction code memory 33 is supplied to the bit-swap code determining unit 75.

The bit-swap code generating unit 71 performs bit-swapping of the new code representing the post-embedding pixel value of the pixel of interest supplied thereto, thereby obtaining all bit-swapping result patterns, and supplies the bit-swap patterns which are pixels values which the bit-swap results represent, to the prediction margin of error calculating unit 73. Further, the bit-swap code generating unit 71 supplies the new code for all patterns obtained as the result of bit-swapping, to the bit-swap code memory 72.

The bit-swap code memory 72 temporarily stores the new code as the bit-swapping request supplied from the bit-swap code generating unit 71. The prediction margin of error calculating unit 73 calculates the prediction margin of error as to the bit-swap values from the bit-swap code generating unit 71, and supplies this to the prediction margin of error memory 74. The prediction margin of error memory 74 temporarily stores the prediction margin of error regarding the new code corresponding to each bit-swap results supplied from the prediction margin of error calculating unit 73.

The bit-swap code determining unit 75 reads out the prediction margin of error stored in the prediction margin of error memory 74, and sorts in ascending order. Further, the bit-swap code determining unit 75 detects the order of the new code of an order corresponding to the correction code in the sorting results of the prediction margin of error, by making reference to the bit-swap code memory 72, and outputs the pixel value which that new code represents, as the decoding results of the pixel of interest.

Also, the bit-swap code determining unit 75 detects the order of the new code corresponding to the embedded pixel value of the pixel of interest in the sorting results of the prediction margin of error, and outputs the value corresponding to that order as the decoded results of the embedded data that was embedded in the embedding pixel value.

Next, the processing of the decoding device shown in FIG. 24 (decoding processing) will be described with reference to the flowchart shown in FIG. 26.

In the event that the decoding apparatus is provided with, for example, one frame (or field) of multiplexed data, the multiplexed data is split into post-embedding image data and coded correction data at the DEMUX 31. Then, in step S61, the post-embedding image data is supplied to the post-embedding image data memory 11, where it is stored. Further, in step S61, the coded correction code is subjected to entropy decoding at the expanding unit 32, and supplied to the correction code memory 33, where it is stored.

Subsequently, the bit-swap reverting unit 61 sequentially takes as pixel of interest, in raster scan order, of the pixels making up the post-embedding image data stored in the post-embedding image data memory 11, those not yet taken as pixel of interest, and in step S62 the prediction value obtaining unit 15 reads out the pixel value of the pixel to the left of the pixel of interest, from the already-decoded pixel values stored in the image data memory 13, and supplies this to the bit-swap reverting unit 61.

In step S63, the bit-swap reverting unit 61 receives the receives the prediction value of the pixel value of the pixel of interest from the prediction value obtaining unit 15, further reads the post-embedding pixel value of the pixel of interest from the post-embedding image data memory 11, and reads out the correction code regarding the pixel of interest from the correction code memory 33. Then, the bit-swap reverting unit 61 performs bit-swapping of the new code representing the post-embedding pixel value of the pixel of interest according to the prediction value of the pixel of interest and the correction code, thereby performing bit-swap reverting processing for decoding the pixel value of the pixel of interest and the embedded data embedded therein.

That is to say, as shown in the flowchart in FIG. 27 for example, in step S63, the bit-swap embedding unit 42 (FIG. 25) obtains the pixel value of the pixel of interest, the prediction value thereof, and correction code regarding the pixel of interest, in step S71. Then, the pixel value of the pixel of interest is supplied to the bit-swap code generating unit 71, the prediction value of the pixel of interest is supplied to the prediction margin of error calculating unit 73, and the correction code is supplied to the bit-swap code determining unit 75.

Subsequently, the flow proceeds to step S72, and the bit-swap code generating unit 71 obtains the bit-swap results for all patterns by performing bit-swapping of the new code representing the post-embedding pixel value of the pixel of interest, and stores this in the bit-swap memory 72. Also, in step S72, the bit-swap code generating unit 71 supplies the bit-swap value which is a pixel value represented by the bit-swap results, to the prediction A margin of error calculating unit 73. Further, in step S72, the prediction margin of error calculating unit 73 calculates the prediction margin of error as to the bit-swap value from the bit-swap code generating unit 71, and supplies this to the prediction margin of error memory 74, where it is stored.

Then, the flow proceeds to step S73, the bit-swap code determining unit 75 reads out the prediction margin of error stored in the prediction margin of error memory 74, and sorts this in ascending order. Further, the bit-swap code determining unit 75 detects the new code corresponding to the correction code in the prediction margin of error sorting results, by making reference to the bit-swap code memory 72, and obtains the pixel value which the new code represents, as the decoding results of the pixel of interest.

Subsequently, in step S74, the bit-swap code determining unit 75 detects, in the prediction margin of error sorting results, the order of the new code corresponding to the embedded pixel value of the pixel of interest, and obtains a value corresponding to that order as the decoding results of the embedded data embedded in the embedded pixel value (or decoded pixel value).

Upon the bit-swap code determining unit 75 thus decoding the pixel value of the pixel of interest and embedded data, in step S75 stores the pixel value of the pixel of interest and embedded data in the image data memory 13 and embedded data memory 14 respectively, and returns.

Returning to FIG. 26, following the processing in step S63, the flow proceeds to step S64, the bit-swap reverting unit 61 judges whether or not processing has been performed for all pixels making up the post-embedding image data stored in the post-embedding image data memory 11, and in the event that judgment is made that processing has not been performed for all pixels as the pixel of interest, the bit-swap reverting unit 61 sequentially takes in raster scan order, as pixel of interest, pixels that have not yet been made the pixel of interest, and the flow returns to step S62.

Also, in the event that judgment is made in step S64 that processing has been performed for all pixels for all pixels making up the post-embedding image data stored in the post-embedding image data memory 11 as the pixel of interest, i.e., in the event that the image data made up of one frame of pixel values has been stored in the image data memory 13 and the embedded data that was embedded in the image data has been stored in the embedded data memory 14, the flow proceeds to step S65, the code converting unit 62 reads out the decoded pixel value from the image data memory 13, and the bit row representing the pixel value is converted from the new code into the conventional code (binary code).

The flow then proceeds to step S66, where pixel values represented by the conventional code are output from the code converting unit 62 and embedded data (or the decoded value thereof) stored therein is output from the embedded data memory 14, and the processing ends.

Figure 26:
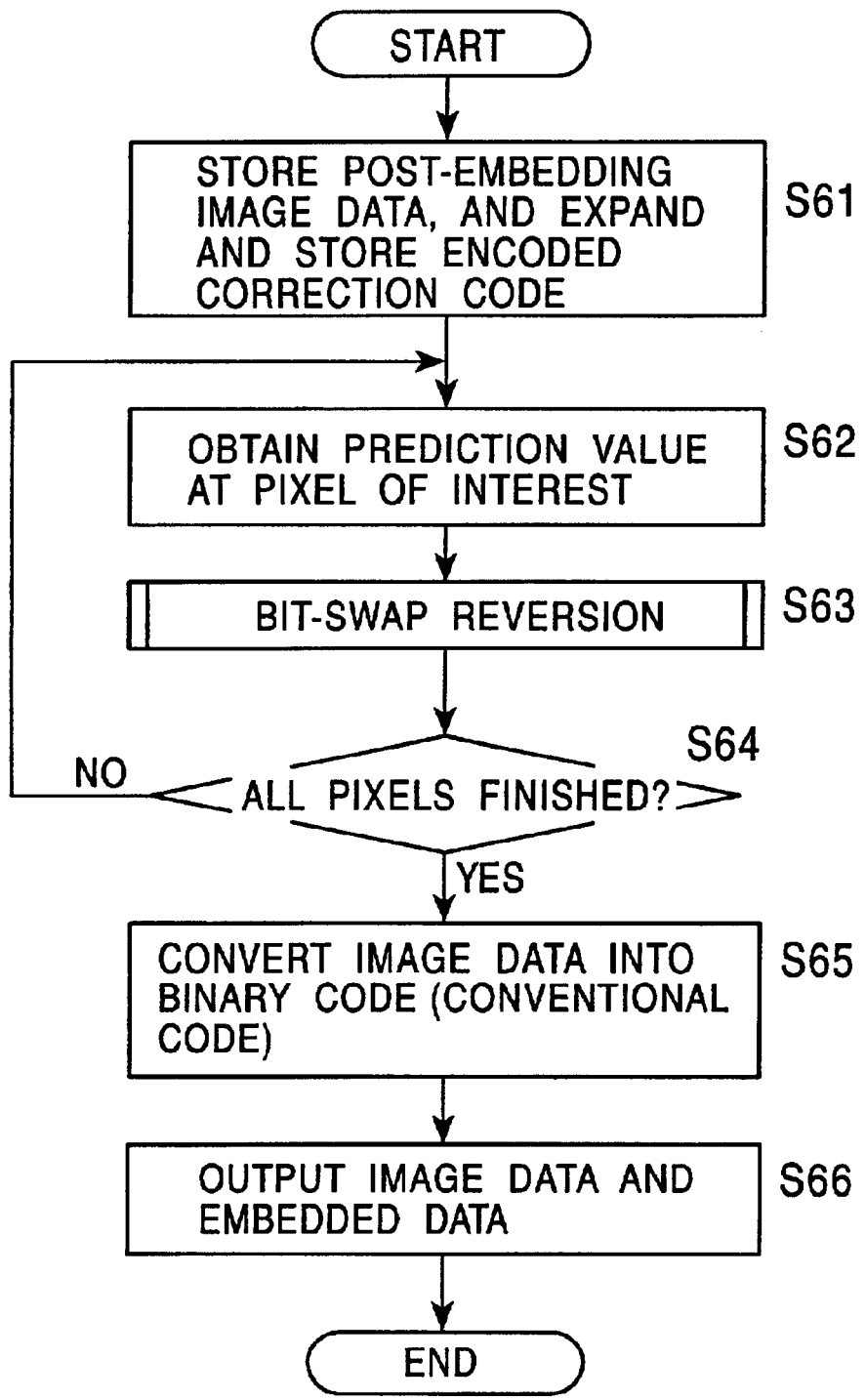
FIG. 26 is a flowchart describing the processing of the decoding apparatus shown in FIG. 24.

Note that the processing in the flowchart shown in FIG. 26 is performed for each frame of image data supplied to the decoding apparatus.

Next, FIGS. 28A and 28B illustrate embedded coding processing simulation results which the present Inventor carried out.

FIG. 28A illustrates the simulation results of embedded coding processing performed using conventional code, and FIG. 28B illustrates the simulation results of embedded coding processing performed using the new code.

For the simulation, a still RGB (Red, Green, Blue) image of 1920 by 1035 pixels (horizontal by vertical dimensions) was used, and embedding data was embedded in each of the R, G, and B components.

In FIGS. 28A and 28B, the term "amount of information that can be embedded" represents the number of bits of data to be embedded which could be embedded per pixel, and this is the same regardless of whether the conventional code was used (FIG. 28A) or the new code was used (FIG. 28B).

Also, the term "amount of correction code data" indicates the amount of data per pixel of coded correction code obtained by subjecting the correction code obtained by performing embedded coding processing to Huffman coding, and it can be understood from FIGS. 28A and 28B that the amount of data per pixel of coded correction code is less with the arrangement using the new code as compared to the arrangement using conventional code.

The term "difference" represents the difference value obtained by subtracting the value of the "amount of correction code data", from the value of the "amount of information that can be embedded", indicating the actual data amount which can be embedded per pixel. Here, the values in each of the columns in FIGS. 28A and 28B are rounded off at two digits.

Now, with the amount of data of the image as A, the amount of data of the embedding data which can be embedded in the image data as B, and the amount of data of the coded correction code obtained by performing embedded coding processing as C, the compression percentage is expressed as (A+C)/(A+B).

While the above embodiment has been described as improving the compression percentage by using completely-reversible embedded coding and decoding processing, and further using the new code, an arrangement may be used wherein the correction code is not used, and only the new code is employed. Even in the event that only the new code is employed, the decoding precision can be improved over arrangements using the conventional code.

That is, with regard to the conventional code wherein the number of 0s or 1s is the same, as described above, the intervals are fine at small pixel values, so even in the event that prediction values with relatively high accuracy are obtained, the prediction values readily make the prediction margin of error as to other pixel values near the true pixel value to be the smallest, and accordingly the true pixel value cannot be accurately decoded.

Conversely, with the new code wherein the number of 0s or 1s is the same, the intervals of pixel values represented by such a new code are uniform and as coarse as possible, so as long as a prediction value with a relatively high accuracy is obtained, the prediction value readily makes the prediction margin of error for the true pixel value to be the smallest, and accordingly, the true pixel value is accurately decoded.

Now, the above-described series of processing can be carried out using hardware, or can be carried out using software. In the event that series of processing is carried out using software, a program comprising the software is installed in a general-purpose computer or the like.

Figure 29:
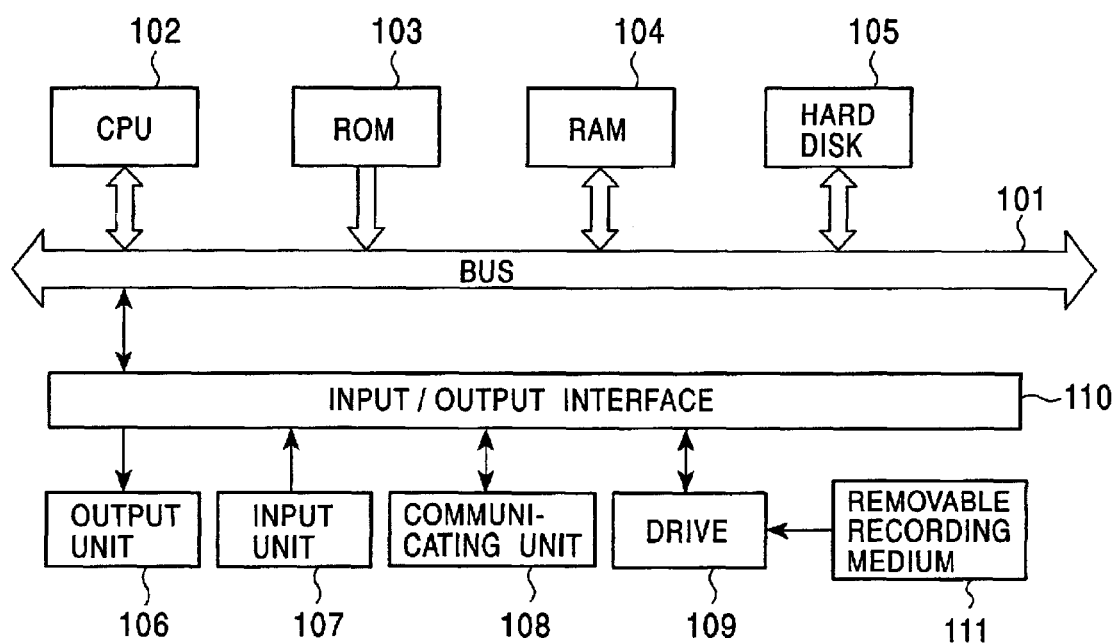
FIG. 29 is a block diagram illustrating an example of the configuration of an embodiment of a computer to which the present invention is applied.

Now, FIG. 29 illustrates a configuration example of an embodiment of a computer to which a program for executing the above-described series of processing is installed.

The program can be stored beforehand in a hard disk 105 or ROM 103 serving as a recording medium that is built into the computer.

Or, the program may be temporarily or permanently stored (recorded) in a removable recording medium 111, such as a floppy disk, a CD-ROM (Compact Disk Read-only Memory), an MO (Magneto-optical) disk, a DVD (Digital Versatile Disk), magnetic disk, semiconductor memory, or the like. Such a removable recording medium 111 can be provided as so-called packaged software.

Also, in addition to installing the program to the computer from such a removable recording medium 111, the program may be transferred from a download site to the computer via a digital satellite-broadcasting satellite, or transferred online to the computer via a network such as a LAN (Local-Area Network) or the Internet, with the computer receiving the program being transferred thus with a communication unit 108, and installing the program on the internal hard disk 105.

The computer has a CPU (Central Processing Unit) built in. An input/output interface 110 is connected to the CPU 102 via a bus 101, and in the event that commands are input by a user operating an input unit 107 made up of a keyboard, mouse, microphone, etc., the program stored in ROM (Read-Only Memory) 103 is executed accordingly. The CPU 102 loads the program stored in the hard disk 105, the program transferred from a satellite or network and received with the communication unit 108 and installed on the hard disk 105, or the program read out from a removable recording medium 111 mounted to a drive 109 and installed on the hard disk 105, to RAM (Random Access Memory) 104 for executing, thereby performing the processing according to the flowcharts in FIGS. 22, 23, 26, 27, etc., or the processing performed by the configuration of the block diagrams shown in FIGS. 20, 21, 24, 25, and so forth. The CPU 102 outputs the processing results from an output unit 106 made up of an LCD (Liquid Crystal Display) or speaker or the like, via the input/output interface 110, or transmits the processing results from the communication unit 108 or further records the processing results on the hard disk 105.

Now, in the present specification, the processing steps described in the program for causing the computer to execute each process does not necessarily have to be processed in time-sequence following the order described in the flowchart, and the present invention also encompasses arrangements wherein these are processed in parallel or individually (e.g., parallel processing or processing by objects).

Also, the program may be processed by a single computer, or may be dispersed and processed by multiple computers. Further, the program may be transferred to and executed by a remote computer.

Note that the data to be embedded may be any sort of data. Examples of data to be embedded include audio data, video data, text data, control programs, and so forth. Also, using a part of the image data for embedding the data to be embedded, as the data to be embedded, enables image data compression to be realized.

Also, the present embodiment has been described as embedding data to be embedded in image data, but the data to be embedded may be embedded in data other than image data, such as, e.g., audio data. That is to say, the data to be embedded can basically be embedded in predicable data. However, in the event of using correction code, the data to be embedded can be embedded in unpredictable (not readily predictable) data.

It should be understood that the correlation between the new code and pixel values shown in FIGS. 15 and 16 is an example, and the present invention is by no means restricted to that shown in FIGS. 15 and 16.

Further, with the present embodiment, the pixel value of the pixel adjacent to the pixel of interest, or the average value of surrounding pixel values, were used as prediction value of the pixel of interest, but in addition to these, the prediction value of the pixel of interest can be obtained using, e.g., the classification application processing which the present Inventor has already proposed.

That is, classification application processing comprises classification processing and application processing, wherein data is classified into one of several classes and application processing is executed to each class. The application processing is a technique such as described below.

That is, with the application processing, the prediction value of an unknown pixel of interest can be obtained by linear association of a known pixel making up an image, for example, and a predetermined tap coefficient.

Specifically, let us consider a situation wherein, for example, with a certain known image as a teacher data, and several images of the image other than the pixel of interest as student data, the prediction value E[y] of the pixel value of the pixel of interest is obtained by a linear primary association model defined by linear association of a set of several known pixel values $X_1$, $X_2$, and so forth, and predetermined tap coefficients $W_1$, $W_2$, and so forth. In this case, the prediction value E[y] can be expressed as $$E[y]=W_1X_1+W_2x_2+\ldots \quad (1)$$

In order to generalize the Expression 1, defining a matrix W comprising the set of tap coefficients $W_j$, a matrix X comprising the set of student data $X_{ij}$, and a matrix Y' comprising the set of prediction values $E[y_j]$, by

[Mathematical Expression 1]

$$X = \begin{bmatrix} X_{11} & X_{12} & \ldots & X_{1J} \\ X_{21} & X_{22} & \ldots & X_{2J} \\ \ldots & \ldots & \ldots & \ldots \\ X_{I1} & X_{I2} & \ldots & X_{IJ} \end{bmatrix} \quad W = \begin{bmatrix} W_1 \\ W_2 \\ \ldots \\ W_J \end{bmatrix}, \quad Y' = \begin{bmatrix} E[y_1] \\ E[y_2] \\ \ldots \\ E[y_I] \end{bmatrix}$$

the following observational equation holds.

$$XW = Y' \quad (2)$$

Now, the component $X_{ij}$ of the matrix X means the No. j student data within the No. i student data set (the set of student data used for predicting the No. i teacher data $y_i$), and the component $w_j$ of the matrix W represents a tap coefficient wherein the product with the No. j student data within the set of student data is computed. Also, $y_i$ represents the No. i teacher data, and accordingly, $E[y_i]$ represents the prediction value of the No. i teacher data. Now, the y to the left of the Expression (1) omits the suffix i of the component $y_i$ in the matrix Y, and the $x_1$, $x_2$, . . . to the right of the Expression (1) also omits the suffix i of the component $x_{ij}$ in the matrix X.

Now, let us consider applying the least square to this observational equation, and obtaining the prediction value E[y] near to the pixel value y of the pixel of interest. In this case, defining a matrix Y comprising a set of true pixel values y of the pixel of interest serving as the teacher data, and a matrix E comprising a set of the remainder e of the prediction value E[y] as to the pixel value y as

[Mathematical Expression 2]

$$E = \begin{bmatrix} e_1 \\ e_2 \\ \ldots \\ e_T \end{bmatrix}, \quad Y = \begin{bmatrix} y_1 \\ y_2 \\ \ldots \\ y_T \end{bmatrix}$$

yields the following remainder expression.

$$XW = Y + E \quad (3)$$

In this case, the tap coefficient W for obtaining the prediction value E[y] near the pixel value y of the pixel of interest can be obtained by the least square margin of error

[Mathematical Expression 3]

$$\sum_{i=1}^{I} e_i^2$$

Accordingly, in the event that the differential of the above square margin of error with the tap coefficient $w_j$ is 0, this means that the tap coefficient $w_j$ which satisfies the following expression is the optimal value for obtaining the prediction value E[y] near the pixel value y of the pixel of interest.

[Mathematical Expression 4]

$$e_1 \frac{\partial e_1}{\partial w_j} + e_2 \frac{\partial e_2}{\partial w_j} + \ldots + e_I \frac{\partial e_I}{\partial w_j} = 0 \, (j = 1, 2, \ldots, J) \quad (4)$$

Accordingly, first, the differential of the Expression (3) by the tap coefficient $w_j$ yields the following expression.

[Mathematical Expression 5]

$$\frac{\partial e_i}{\partial w_1} = x_{i1}, \frac{\partial e_i}{\partial w_2} = x_{i2}, \ldots, \frac{\partial e_i}{\partial w_J} = x_{iJ}, (i = 1, 2, \ldots, I) \quad (5)$$

The Expressions (4) and (5) yield Expression (6).

[Mathematical Expression 6]

$$\sum_{i=1}^{I} e_i x_{i1} = 0, \sum_{i=1}^{I} e_i x_{i2} = 0, \ldots \sum_{i=1}^{I} e_i x_{iJ} = 0 \quad (6)$$

Further, taking into consideration the relation between the student data $x_{ij}$, the tap coefficient $w_j$, the teacher data $y_1$, and the residue $e_i$ in the residual expression in Expression (3), the following normal expression can be obtained.

[Mathematical Expression 7]

$$\begin{cases} \left(\sum_{i=1}^{I} x_{i1} x_{i1}\right) w_1 + \left(\sum_{i=1}^{I} x_{i1} x_{i2}\right) w_2 + \ldots + \left(\sum_{i=1}^{I} x_{i1} x_{iJ}\right) w_J = \left(\sum_{i=1}^{I} x_{i1} y_i\right) \\ \left(\sum_{i=1}^{I} x_{i2} x_{i1}\right) w_1 + \left(\sum_{i=1}^{I} x_{i2} x_{i2}\right) w_2 + \ldots + \left(\sum_{i=1}^{I} x_{i2} x_{iJ}\right) w_J = \left(\sum_{i=1}^{I} x_{i2} y_i\right) \\ \left(\sum_{i=1}^{I} x_{iJ} x_{i1}\right) w_1 + \left(\sum_{i=1}^{I} x_{iJ} x_{i2}\right) w_2 + \ldots + \left(\sum_{i=1}^{I} x_{iJ} x_{iJ}\right) w_J = \left(\sum_{i=1}^{I} x_{iJ} y_i\right) \end{cases} \quad (7)$$

Now, with the normal expression shown in Expression 7, defining the matrix (covariance matrix) A and the vector v as

[Mathematical Expression 8]

$$A = \begin{pmatrix} \sum_{i=1}^{I} x_{i1} x_{i1} & \sum_{i=1}^{I} x_{i1} x_{i2} & \ldots & \sum_{i=1}^{I} x_{i1} x_{iJ} \\ \sum_{i=1}^{I} x_{i2} x_{i1} & \sum_{i=1}^{I} x_{i2} x_{i2} & \ldots & \sum_{i=1}^{I} x_{i2} x_{iJ} \\ \sum_{i=1}^{I} x_{iJ} x_{i1} & \sum_{i=1}^{I} x_{iJ} x_{i2} & \ldots & \sum_{i=1}^{I} x_{iJ} x_{iJ} \end{pmatrix} \quad v = \begin{pmatrix} \sum_{i=1}^{I} x_{i1} y_i \\ \sum_{i=1}^{I} x_{i2} y_i \\ \vdots \\ \sum_{i=1}^{I} x_{iJ} y_i \end{pmatrix}$$

and defining the vector W as shown in Expression 1, this can be expressed as $$AW = v \quad (8)$$

The normal expressions in Expression (7) allow the same number as the number J of the tap coefficient $w_j$ to be obtained to be given by preparing a certain number of student data $x_{ij}$ and teacher data $y_i$ sets, and accordingly, an optimal tap coefficient $W_j$ can be obtained by solving the Expression (8) with regard to the vector W (though the matrix A in the Expression (8) must be normal for the Expression (8) to be solved). For solving the Expression (8), the sweep method (Gauss-Jordan elimination) or the like can be used, for example.

As described above, obtaining an optimal tap coefficient $w_j$ and further using the tap coefficient $w_j$ to obtain the prediction value E[y] near the pixel value y of the pixel of interest is optimal processing.

The prediction value of the pixel of interest can be obtained by classification application processing such as described above.

What is claimed is:

1. A data processing apparatus for embedding second digital data in first digital data, said data processing apparatus comprising:

bit-swap means for bit-swapping target data comprising a predetermined number of bits within said first digital data;

predicting means for outputting a prediction value which predicts a value corresponding to said target data from marginal data surrounding said target data;

sorting means for sorting target data subjected to said bit-swapping, according to the prediction margin of error value between a prediction value output by said predicting means and respective values corresponding to target data subjected to said bit-swapping;

correction code output means for outputting correction code according to target data subjected to said bit-swapping that has been sorted by said sorting means; and embedded data output means for outputting, as embedded data, one of said target data subjected to said bit-swapping that has been sorted by said sorting means, according to said second digital data.

2. A data processing apparatus according to claim 1, wherein said predicting means output a prediction value predicting a value corresponding to said target data from a value wherein marginal data which is a first code surrounding said target data has been converted into n-notation data (wherein n>2 and is a natural number);

and wherein said sorting means detect, as said prediction margin of error value, the absolute value difference value between the prediction value output by said predicting means and the value wherein target data as first code subjected to bit-swapping is converted into n-notation data, for each target data subjected to said bit-swapping, and sort said target data subjected to said bit-swapping according to said prediction margin of error.

3. A data processing apparatus according to claim 2, wherein said predicting means output a prediction value predicting a value corresponding to said target data from a value wherein marginal data which is a binary code surrounding said target data has been converted into decimal data;

and wherein said sorting means detect, as said prediction margin of error value, the absolute value difference value between the prediction value output by said predicting means and the value wherein target data as binary code subjected to bit-swapping is converted into decimal data, for each target data subjected to said bit-swapping, and sort said target data subjected to said bit-swapping according to said prediction margin of error.

4. A data processing apparatus according to claim 2, further comprising:

code converting means for converting said first digital data into a new code wherein a value is appropriated to each code such that the intervals between values corresponding to code generated by bit strings, with the same number of 0s and 1s, being subjected to swapping, are essentially uniform, based on the value of said first digital data being converted as said first code;

wherein said predicting means output a prediction value predicting a value corresponding to said target data from a value wherein marginal data which is said new code surrounding said target data into decimal data;

and wherein said sorting means detect, as said prediction margin of error value, the absolute value difference value between the prediction value output by said predicting means and the value wherein target data as new code subjected to bit-swapping is converted into decimal data, for each target data subjected to said bit-swapping, and sort said target data subjected to said bit-swapping according to said prediction margin of error.

5. A data processing apparatus according to claim 2, further comprising reading means for reading said second digital data which is equivalent to the number of bits which can be embedded in said target data;

wherein said embedded data output means outputs one of target data subjected to said bit-swapping that have been sorted by said sorting means, as embedded data, according to said second digital data read out by said reading means.

6. A data processing apparatus according to claim 1, wherein said correction code output means output, as a correction code, the difference between said target data wherein said prediction margin of error value is subjected to minimal said bit-swapping, and said sorted order of said target data.

7. A data processing apparatus according to claim 6, further comprising compressing coding means for performing compression coding of the correction code output by said correction code output means.

8. A data processing apparatus according to claim 7, wherein said compressing coding means subjects said correction code to entropy coding.

9. A data processing apparatus according to claim 1, wherein said first digital data is video/image data.

10. A data processing apparatus according to claim 1, wherein said first digital data is audio data.

11. A data processing apparatus for embedding second digital data in first digital data, said data processing apparatus comprising:

first reading means for reading target data from said first digital data;

bit-swap means for bit-swapping said target data comprising a predetermined number of bits read out by said first reading means;

predicting means for outputting a prediction value which predicts a value corresponding to said target data from a value wherein marginal data which is binary code surrounding said target data is converted into decimal data;

sorting means for detecting, as said prediction margin of error value, the absolute value difference value between the prediction value output by said predicting means and the value wherein target data as binary code subjected to said bit-swapping is converted into decimal data, for each target data subjected to said bit-swapping, and sorting target data subjected to said bit-swapping, in ascending order of said prediction margin of error value;

second reading means for reading out said second digital data which is equivalent to the number of bits which can be embedded in said target data read out by said first reading means;

correction code output means for outputting, as correction code, the difference in said sorted order between target data wherein said detected prediction margin of error value is subjected to minimal said bit-swapping, and said target data that has been read out; and embedded data output means for outputting, as embedded data, said bit-swapped target data of the order corresponding to said second digital data read out by said second reading means.

12. A data processing apparatus for embedding second digital data in first digital data, said data processing apparatus comprising:

code converting means for converting said first digital data into a new code wherein a value is appropriated to each code such that the intervals between values corresponding to code generated by bit strings, with the same number of 0s and 1s, being subjected to swapping, are essentially uniform, based on the value of said first digital data being converted as binary code;

first reading means for reading target data from said first digital data converted to said new code;

bit-swap means for bit-swapping said target data comprising a predetermined number of bits read out by said first reading means;

predicting means for outputting a prediction value for predicting the value of said target data from a value corresponding to marginal data which is new code surrounding said target data;

sorting means for detecting, as said prediction margin of error value, the absolute value difference value between the prediction value output by said predicting means and the value corresponding to target data as said bit-swapped new code, for each target data subjected to said bit-swapping, and sorting target data subjected to said bit-swapping, in ascending order of said prediction margin of error value;

second reading means for reading out second digital data corresponding to the number of bits that can be embedded in target data read out by said first reading means;

correction code output means for outputting, as correction code, the difference in said sorted order between target data wherein said detected prediction margin of error value is subjected to minimal said bit-swapping, and said target data that has been read out; and embedded data output means for outputting, as embedded data, said bit-swapped target data of the order corresponding to said second digital data read out by said second reading means.

13. A data processing apparatus for embedding second digital data in first digital data, said data processing apparatus comprising:

code converting means for converting said first digital data into a new code wherein a value is appropriated to each code such that the intervals between values corresponding to code generated by bit strings, with the same number of 0s and 1s, being subjected to swapping, are essentially uniform, based on the value of said first digital data being converted as said first code;

bit-swap means for bit-swapping said target data comprising a predetermined number of bits within said first digital data converted into said new code;

predicting means for outputting a prediction value for predicting the value of said target data from a value corresponding to marginal data which is new code surrounding said target data;

sorting means for sorting said target data subjected to said bit-swapping, according to the prediction margin of error between the prediction value output by said predicting means and each value corresponding to target data as said new code subjected to said bit-swapping; and embedded data output means for outputting, as embedded data, one of said bit-swapped target data sorted by said sorting means, according to said second digital data.

14. A data processing method for embedding second digital data in first digital data, said data processing method comprising the steps of:

a bit-swap step for bit-swapping target data comprising a predetermined number of bits within said first digital data;

a predicting step for outputting a prediction value which predicts a value corresponding to said target data from marginal data surrounding said target data;

a sorting step for sorting target data subjected to said bit-swapping according to the prediction margin of error value of said prediction value and respective values corresponding to target data subjected to said bit-swapping;

a correction code output step for outputting correction code according to target data subjected to said bit-swapping that has been sorted; and an embedded data output step for outputting, as embedded data, one of said target data subjected to said bit-swapping that has been sorted, according to said second digital data.

15. A data processing method for embedding second digital data in first digital data, said data processing method comprising the steps of:

a first reading step for reading target data from said first digital data;

a marginal data reading step for reading marginal data surrounding said target data;

a bit-swap step for bit-swapping said target data comprising a predetermined number of bits;

a predicting step for outputting a prediction value which predicts a value corresponding to said target data from a value wherein marginal data which is binary code is converted into decimal data;

a detecting step for detecting, as said prediction margin of error value, the absolute value difference value between the prediction value and the value wherein target data as binary code subjected to said bit-swapping is converted into decimal data, for each target data subjected to said bit-swapping;

a sorting step for sorting target data subjected to said bit-swapping, in ascending order of said prediction margin of error value;

a second reading step for reading out said second digital data which is equivalent to the number of bits which can be embedded in said target data;

a correction code output step for outputting, as correction code, the difference in said sorted order between target data wherein said detected prediction margin of error value is subjected to minimal said bit-swapping, and said target data that has been read out; and an embedded data output step for outputting, as embedded data, said bit-swapped target data of the order corresponding to said second digital data that has been read out.

16. A data processing method for embedding second digital data in first digital data, said data processing method comprising the steps of:

a code converting step for converting said first digital data into a new code wherein a value is appropriated to each code such that the intervals between values corresponding to code generated by bit strings, with the same number of 0s and 1s, being subjected to swapping, are essentially uniform, based on the value of said first digital data being converted as binary code;

a first reading step for reading target data from said first digital data converted to said new code;

a marginal data reading step for reading marginal data surrounding said target data;

a bit-swap step for bit-swapping said target data comprising a predetermined number of bits;

a predicting step for outputting a prediction value for predicting the value of said target data from a value corresponding to marginal data which is new code surrounding said target data;

a detecting step for detecting, as said prediction margin of error value, the absolute value difference value between the prediction value and target data as said bit-swapped new code, for each target data subjected to said bit-swapping;

a sorting step for sorting target data subjected to said bit-swapping, in ascending order of said prediction margin of error value detected;

a second reading step for reading out second digital data corresponding to the number of bits that can be embedded in target data read;

a correction code output step for outputting, as correction code, the difference in said sorted order between target data wherein said detected prediction margin of error value is subjected to minimal said bit-swapping, and said target data that has been read out; and an embedded data output step for outputting, as embedded data, said bit-swapped target data of the order corresponding to said second digital data that has been read out.

17. A data processing method for embedding second digital data in first digital data, said data processing method comprising the steps of:

a code converting step for converting said first digital data into a new code wherein a value is appropriated to each code such that the intervals between values corresponding to code generated by bit strings, with the same number of 0s and 1s, being subjected to swapping, are essentially uniform, based on the value of said first digital data being converted as said first code;

a bit-swap step for bit-swapping said target data comprising a predetermined number of bits within said first digital data converted into said new code;

a prediction value output step for outputting a prediction value for predicting the value of said target data from a value corresponding to marginal data which is new code surrounding said target data;

a sorting step for sorting said target data subjected to said bit-swapping, according to the prediction margin of error value between the prediction value and each value corresponding to target data as said new code subjected to said bit-swapping; and an embedded data output step for outputting, as embedded data, one of said bit-swapped target data, according to said second digital data.

18. A storage medium storing a data processing program for embedding second digital data in first digital data, said program comprising the steps of:

a bit-swap step for bit-swapping target data comprising a predetermined number of bits within said first digital data;

a prediction value output step for outputting a prediction value which predicts a value corresponding to said target data from marginal data surrounding said target data;

a sorting step for sorting target data subjected to said bit-swapping, according to the prediction margin of error value of said prediction value, and values corresponding to target data subjected to said bit-swapping;

a correction code output step for outputting correction code according to target data subjected to said bit-swapping that has been sorted; and an embedded data output step for outputting, as embedded data, one of said target data subjected to said bit-swapping that has been sorted, according to said second digital data.

19. A storage medium storing a data processing program for embedding second digital data in first digital data, said program comprising the steps of:

a first reading step for reading target data from said first digital data;

a marginal data reading step for reading marginal data surrounding said target data;

a bit-swap step for bit-swapping said target data comprising a predetermined number of bits;

a predicting step for outputting a prediction value which predicts a value corresponding to said target data from a value wherein marginal data which is binary code surrounding said target data is converted into decimal data;

a detecting step for detecting, as said prediction margin of error value, the absolute value difference value between the prediction value and the value wherein target data as binary code subjected to said bit-swapping is converted into decimal data, for each target data subjected to said bit-swapping;

a sorting step for sorting target data subjected to said bit-swapping, in ascending order of said detected prediction margin of error value;

a second reading step for reading out said second digital data which is equivalent to the number of bits which can be embedded in said target data that has been read out;

a correction code output step for outputting, as correction code, the difference in said sorted order between target data wherein said detected prediction margin of error value is subjected to minimal said bit-swapping, and said target data that has been read out; and an embedded data output step for outputting, as embedded data, said bit-swapped target data of the order corresponding to said second digital data that has been read out.

20. A storage medium storing a data processing program for embedding second digital data in first digital data, said program comprising the steps of:

a code converting step for converting said first digital data into a new code wherein a value is appropriated to each code such that the intervals between values corresponding to code generated by bit strings, with the same number of 0s and 1s, being subjected to swapping, are essentially uniform, based on the value of said first digital data being converted as binary code;

a first reading step for reading target data from said first digital data converted to said new code;

a marginal data reading step for reading marginal data surrounding said target data;

a bit-swap step for bit-swapping said target data comprising a predetermined number of bits;

a predicting step for outputting a prediction value for predicting the value of said target data from a value corresponding to marginal data which is new code;

a detecting step for detecting, as said prediction margin of error value, the absolute value difference value between the prediction value and target data as said bit-swapped new code, for each target data subjected to said bit-swapping;

a sorting step for sorting target data subjected to said bit-swapping, in ascending order of said detected prediction margin of error value;

a second reading step for reading out second digital data corresponding to the number of bits that can be embedded in target data that has been read out;

a correction code output step for outputting, as correction code, the difference in said sorted order between target data wherein said detected prediction margin of error value is subjected to minimal said bit-swapping, and said target data that has been read out; and an embedded data output step for outputting, as embedded data, said bit-swapped target data of the order corresponding to said second digital data that has been read out.

21. A storage medium storing a data processing program for embedding second digital data in first digital data, said program comprising the steps of:

a code converting step for converting said first digital data into a new code wherein a value is appropriated to each code such that the intervals between values corresponding to code generated by bit strings, with the same number of 0s and 1s, being subjected to swapping, are essentially uniform, based on the value of said first digital data being converted as said first code;

a bit-swap step for bit-swapping said target data comprising a predetermined number of bits within said first digital data converted into said new code;

a prediction value output step for outputting a prediction value for predicting the value of said target data from a value corresponding to marginal data which is new code surrounding said target data;

a sorting step for sorting said target data subjected to said bit-swapping according to the prediction margin of error value between a prediction value and respective values corresponding to target data as said new code subjected to said bit-swapping; and an embedded data output step for outputting, as embedded data, one of said bit-swapped target data sorted in said sorting step, according to said second digital data.

22. A decoding apparatus for decoding first digital data and second digital data from embedded data wherein said second digital data is embedded in said first digital data and from a correction code, said decoding apparatus comprising:

bit-swap means for bit-swapping target data comprising a predetermined number of bits within said embedded data;

predicting means for outputting a prediction value which predicts a value of decoded data decoded from said target data, from a value corresponding to decoded data surrounding said target data which has already been decoded;

sorting means for sorting target data subjected to said bit-swapping according to the prediction margin of error value between a prediction value output by said predicting means and respective values corresponding to target data subjected to said bit-swapping by said bit-swap means;

decoded data output means for outputting, as decoded data, one code of said bit-swapped target data sorted by said sorting means, according to said correction code; and second digital data output means for outputting second digital data according to the order of said target data, by bit-swapped target data sorted by said sorting means.

23. A decoding apparatus according to claim 22, wherein said predicting means output a prediction value predicting the value of decoded data decoded from said target data, from a value wherein decoded data surrounding said target data that has already been decoded, which is a first code, has been converted into n-notation data (wherein n>2 and is a natural number);

and wherein said sorting means detect, as said prediction margin of error value, the absolute value difference value between the prediction value output by said predicting means and the value wherein target data as first code subjected to bit-swapping is converted into n-notation data by said bit-swap means, for each target data subjected to said bit-swapping, and sort said target data subjected to said bit-swapping according to said prediction margin of error value.

24. A decoding apparatus according to claim 23, wherein said predicting means output a prediction value predicting the value of decoded data decoded from said target data, from a value wherein decoded data surrounding said target data which has already been decoded which is a binary code has been converted into decimal data;

and wherein said sorting means detect, as said prediction margin of error value, the absolute value difference value between the prediction value output by said predicting means and the value wherein target data as binary code subjected to bit-swapping is converted into binary data by said bit-swap means, for each target data subjected to said bit-swapping, and sort said target data subjected to said bit-swapping according to said prediction margin of error value.

25. A decoding apparatus according to claim 23, wherein said predicting means output a prediction value predicting the value of decoded data decode from said target data, from a value corresponding to decoded data surrounding said target data which has already been decoded which is a new code wherein a value is appropriated to each code such that the intervals between decimal values corresponding to code generated by bit strings, with the same number of 0s and 1s, being subjected to swapping, are essentially uniform;

and wherein said sorting means detect, as said prediction margin of error value, the absolute value difference value between the prediction value output by said predicting means and a value corresponding to target data as new code subjected to bit-swapping by said bit-swap means, for each target data subjected to said bit-swapping, and sort said target data subjected to said bit-swapping according to said prediction margin of error value.

26. A decoding apparatus according to claim 25, wherein said decoded data output means outputs, as decoded data, target data subjected to said bit-swapping in an order corresponding to said correction code, out of said bit-swapped target data sorted by said sorting means.

27. A decoding apparatus according to claim 26, further comprising code converting means for outputting binary code equivalent to a decimal value corresponding to decoded data which is said new code output by said decoding data output means.

28. A decoding apparatus according to claim 22, further comprising decoding means for decoding correction code subjected to compression coding, and outputting the correction code.

29. A decoding apparatus according to claim 28, wherein said decoding means decodes correction code subjected to entropy coding, and outputs the correction code.

30. A decoding apparatus according to claim 22, wherein said first digital data is video/image data.

31. A decoding apparatus according to claim 22, wherein said first digital data is audio data.

32. A decoding apparatus for decoding first digital data and second digital data from embedded data wherein said second digital data is embedded in said first digital data and from a correction code, said decoding apparatus comprising:

reading means for reading target data from said embedded data;

bit-swap means for bit-swapping said target data comprising a predetermined number of bits;

predicting means for outputting a prediction value which predicts a value of decoded data decoded from said target data, from a value wherein decoded data which is binary code surrounding said target data that has already been decoded is converted into decimal data;

sorting means for detecting the absolute value difference value between the prediction value output by said predicting means and the value wherein target data as binary code subjected to said bit-swapping by said bit-swap means is converted into decimal data, for each target data subjected to said bit-swapping, and sorting target data subjected to said bit-swapping, in ascending order of said prediction margin of error value;

decoded data output means for outputting, as decoded data, target data subjected to said bit-swapping in an order corresponding to said correction code, out of said bit-swapped target data sorted by said sorting means; and second digital data output means for outputting second digital data according to the order of target data read out by said reading means, from bit-swapped target data sorted by said sorting means.

33. A decoding apparatus for decoding first digital data and second digital data from embedded data wherein said second digital data is embedded in said first digital data and from a correction code, said decoding apparatus comprising:

reading means for reading target data from said embedded data;

bit-swap means for bit-swapping said target data comprising a predetermined number of bits;

predicting means for outputting a prediction value for predicting the value of decoded data decoded from said target data, from a value corresponding to decoded data surrounding said target data that has already been decoded which is a new code wherein a value is appropriated to each code such that the intervals between decimal values corresponding to code generated by bit strings, with the same number of 0s and 1s, being subjected to swapping, are essentially uniform;

sorting means for detecting, as said prediction margin of error value, the absolute value difference value between the prediction value output by said predicting means and the value corresponding to target data as said new code subjected to bit-swapping by said bit-swap means, for each target data subjected to said bit-swapping, and sorting target data subjected to said bit-swapping, in ascending order of said prediction margin of error value;

decoded data output means for outputting, as decoded data, target data subjected to said bit-swapping in an order corresponding to said correction code, out of said bit-swapped target data sorted by said sorting means;

second digital data output means for outputting second digital data according to the order of target data read out by said reading means, from bit-swapped target data sorted by said sorting means; and code converting means for outputting binary code equivalent to a decimal value corresponding to decoded data which is said new code output by said decoded data output means.

34. A decoding apparatus for decoding first digital data and second digital data from embedded data wherein said second digital data is embedded in said first digital data, said decoding apparatus comprising:

bit-swap means for bit-swapping said target data comprising a predetermined number of bits from said embedded data;

predicting means for outputting a prediction value for predicting the value of decoded data decoded from said target data, from a value corresponding to decoded data surrounding already-decoded said target data which is a new code wherein a value is appropriated to each code such that the intervals between values corresponding to code generated by bit strings, with the same number of 0s and 1s, being subjected to swapping, are essentially uniform;

sorting means for sorting said target data subjected to said bit-swapping according to the prediction margin of error value between a prediction value output by said predicting means and respective values corresponding to target data as said new code subjected to said bit-swapping by said bit-swap means;

second digital data output means for outputting second digital data according to the order of target data, from bit-swapped target data sorted by said sorting means; and code converting means for outputting original code equivalent to a decimal value corresponding to decoded data which is said new code output by said decoded data output means.

35. A decoding method for decoding first digital data and second digital data from embedded data wherein said second digital data is embedded in said first digital data and from a correction code, said decoding method comprising the steps of:

a bit-swap step for bit-swapping target data comprising a predetermined number of bits within said embedded data;

a prediction value output step for outputting a prediction value which predicts a value of decoded data decoded from said target data, from a value corresponding to decoded data surrounding said target data which has already been decoded;

a sorting step for sorting target data subjected to said bit-swapping according to the prediction margin of error value between a prediction value and respective values corresponding to target data subjected to said bit-swapping;

a decoded data output step for outputting, as decoded data, one code of said bit-swapped target data that has been sorted, according to said correction code; and a second digital data output step for outputting second digital data according to the order of said target data, by bit-swapped target data that has been sorted.

36. A decoding method for decoding first digital data and second digital data from embedded data wherein said second digital data is embedded in said first digital data and from a correction code, said decoding method comprising the steps of:

a reading step for reading target data from said embedded data;

a bit-swap step for bit-swapping said target data comprising a predetermined number of bits;

a prediction value output step for outputting a prediction value which predicts a value of decoded data decoded from said target data, from a value wherein decoded data which is binary code surrounding said target data that has already been decoded is converted into decimal data;

a detecting step for detecting, as a prediction margin of error value, the absolute value difference value between the prediction value and the value wherein target data as binary code subjected to said bit-swapping is converted into decimal data, for each target data subjected to said bit-swapping;

a sorting step for sorting target data subjected to said bit-swapping, in ascending order of said detected prediction margin of error value;

a decoded data output step for outputting, as decoded data, target data subjected to said bit-swapping in an order corresponding to said correction code, out of said bit-swapped target data that has been sorted; and a second digital data output step for outputting second digital data according to the order of target data that has been read out, from bit-swapped target data that has been sorted.

37. A decoding method for decoding first digital data and second digital data from embedded data wherein said second digital data is embedded in said first digital data and from a correction code, said decoding method comprising the steps of:

a reading step for reading out target data from said embedded data;

a bit-swap step for bit-swapping said target data comprising a predetermined n umber of b its;

a prediction value output step for outputting a prediction value for predicting the value of decoded data decoded from said target data, from a value corresponding to decoded data surrounding said target data that has already been decoded which is a new code wherein a value is appropriated to each code such that the intervals between decimal values corresponding to code generated by bit strings, with the same number of 0s and 1s, being subjected to swapping, are essentially uniform;

a detecting step for detecting, as said prediction margin of error value, the absolute value difference value between the prediction value and the value corresponding to target data as said new code subjected to bit-swapping, for each target data subjected to said bit-swapping;

a sorting step for sorting target data subjected to said bit-swapping, in ascending order of said detected prediction margin of error value;

a decoded data output step for outputting, as decoded data, target data subjected to said bit-swapping in an order corresponding to said correction code, out of said bit-swapped target data that has been sorted;

a second digital data output step for outputting second digital data according to the order of target data that has been read out, from bit-swapped target data that has been sorted; and a code converting step for outputting binary code equivalent to a decimal value corresponding to decoded data which is said new code.

38. A decoding method for decoding first digital data and second digital data from embedded data wherein said second digital data is embedded in said first digital data, said decoding method comprising the steps of a bit-swap step for bit-swapping said target data comprising a predetermined number of bits from said embedded data;

a prediction value output step for outputting a prediction value for predicting the value of decoded data decoded from said target data, from a value corresponding to decoded data surrounding already-decoded said target data which is a new code wherein a value is appropriated to each code such that the intervals between values corresponding to code generated by bit strings, with the same number of 0s and 1s, being subjected to swapping, are essentially uniform;

a sorting step for sorting said target data subjected to said bit-swapping according to the prediction margin of error value between the prediction value and respective values corresponding to target data as said new code subjected to said bit-swapping;

a second digital data output step for outputting second digital data according to the order of target data, from bit-swapped target data that has been sorted; and a code converting step for outputting original code corresponding to decoded data which is said new code.

39. A storage medium storing a decoding program for decoding first digital data and second digital data from embedded data wherein said second digital data is embedded in said first digital data and from a correction code, said program comprising the steps of:

a bit-swap step for bit-swapping target data comprising a predetermined number of bits within said embedded data;

a prediction value output step for outputting a prediction value which predicts a value of decoded data decoded from said target data, from a value corresponding to decoded data surrounding said target data which has already been decoded;

a sorting step for sorting target data subjected to said bit-swapping according to the prediction margin of error value between a prediction value output by said predicting step and respective values corresponding to target data subjected to said bit-swapping by said bit-swap step;

a decoded data output step for outputting, as decoded data, one code of said bit-swapped target data that has been sorted, according to said correction code; and a second digital data output step for outputting second digital data according to the order of said target data, by bit-swapped target data that has been sorted.

40. A storage medium storing a decoding program for decoding first digital data and second digital data from embedded data wherein said second digital data is embedded in said first digital data and from a correction code, said program comprising the steps of:

a reading step for reading out target data from said embedded data;

a bit-swap step for bit-swapping said target data comprising a predetermined number of bits;

a prediction value output step for outputting a prediction value which predicts a value of decoded data decoded from said target data, from a value wherein decoded data which is binary code surrounding said target data that has already been decoded is converted into decimal data;

a detecting step for detecting, as a prediction margin of error value, the absolute value difference value between the prediction value and the value wherein target data as binary code subjected to said bit-swapping is converted into decimal data, for each target data subjected to said bit-swapping;

a sorting step for sorting target data subjected to said bit-swapping, in ascending order of said detected prediction margin of error value;

a decoded data output step for outputting, as decoded data, target data subjected to said bit-swapping in an order corresponding to said correction code, out of said bit-swapped target data that has been sorted; and a second digital data output step for outputting second digital data according to the order of target data that has been read out, from bit-swapped target data that has been sorted.

41. A storage medium storing a decoding program for decoding first digital data and second digital data from embedded data wherein said second digital data is embedded in said first digital data and from a correction code, said program comprising the steps of:

a reading step for reading out target data from said embedded data;

a bit-swap step for bit-swapping said target data comprising a predetermined number of bits;

a prediction value output step for outputting a prediction value for predicting the value of decoded data decoded from said target data, from a value corresponding to decoded data surrounding said target data that has already been decoded which is a new code wherein a value is appropriated to each code such that the intervals between decimal values corresponding to code generated by bit strings, with the same number of 0s and 1s, being subjected to swapping, are essentially uniform;

a detecting step for detecting, as said prediction margin of error value, the absolute value difference value between the prediction value and the value corresponding to target data as said new code subjected to bit-swapping, for each target data subjected to said bit-swapping;

a sorting step for sorting target data subjected to said bit-swapping, in ascending order of said detected prediction margin of error value;

a decoded data output step for outputting, as decoded data, target data subjected to said bit-swapping in an order corresponding to said correction code, out of said bit-swapped target data that has been sorted;

a second digital data output step for outputting second digital data according to the order of target data that has been read out, from bit-swapped target data that has been sorted; and a code converting step for outputting binary code equivalent to a decimal value corresponding to decoded data which is said new code.

42. A storage medium storing a decoding program for decoding first digital data and second digital data from embedded data wherein said second digital data is embedded in said first digital data, said program comprising the steps of:

a bit-swap step for bit-swapping said target data comprising a predetermined number of bits from said embedded data;

a prediction value output step for outputting a prediction value for predicting the value of decoded data decoded from said target data, from a value corresponding to decoded data surrounding already-decoded said target data which is a new code wherein a value is appropriated to each code such that the intervals between values corresponding to code generated by bit strings, with the same number of 0s and 1s, being subjected to swapping, are essentially uniform;

a sorting step for sorting said target data subjected to said bit-swapping, according to the prediction margin of error value between the prediction value and the value corresponding to target data as said new code subjected to said bit-swapping;

a second digital data output step for outputting second digital data according to the order of target data, from bit-swapped target data that has been sorted; and a code converting step for outputting original code corresponding to decoded data which is said new code.

* * * * *